United States Patent [19]
Kato et al.

[11] Patent Number: 5,544,336
[45] Date of Patent: Aug. 6, 1996

[54] PARALLEL DATA PROCESSING SYSTEM WHICH EFFICIENTLY PERFORMS MATRIX AND NEUROCOMPUTER OPERATIONS, IN A NEGLIGIBLE DATA TRANSMISSION TIME

[75] Inventors: Hideki Kato; Hideki Yoshizawa; Hiroki Iciki; Daiki Masumoto, all of Kawasaki, Japan

[73] Assignee: Fujitsu Limited, Japan

[21] Appl. No.: 420,332

[22] Filed: Apr. 11, 1995

Related U.S. Application Data

[63] Continuation of Ser. No. 853,429, Mar. 18, 1992, abandoned.

[30] Foreign Application Priority Data

Mar. 19, 1991 [JP] Japan ..................... 3-0544725

[51] Int. Cl.$^6$ ..................................... G06F 3/00
[52] U.S. Cl. ..................... 395/311; 395/309; 364/229; 364/240.7
[58] Field of Search ..................... 395/325, 800, 395/309, 311

[56] References Cited

U.S. PATENT DOCUMENTS

| | | | |
|---|---|---|---|
| 4,816,993 | 5/1989 | Takahashi et al. | 395/250 |
| 5,014,235 | 5/1991 | Morton | 395/275 |
| 5,129,092 | 7/1992 | Wilson | 395/800 |
| 5,138,704 | 8/1992 | Takahashi et al. | 395/325 |
| 5,170,484 | 12/1992 | Grondalski | 395/800 |
| 5,187,801 | 2/1993 | Zenios et al. | 395/800 |

FOREIGN PATENT DOCUMENTS

| | | |
|---|---|---|
| 0236762 | 9/1987 | European Pat. Off. . |
| 0256661 | 2/1988 | European Pat. Off. . |

OTHER PUBLICATIONS

S. Y. Kung et al; "Parallel Architectures for Artificial Neural Nets" Princeton University Dept of EE; INNS 1988. pp. II–165 to II–172.

Kung; "Parallel Architectures for Artificial Neural Nets"; Princeton University of EE; IEEE 1988; pp. 163–174.

IEEE Transactions on Acoustics, Speech and Signal Processing, vol. 37, No. 12, Dec. 1989, New York U.S., pp. 1967–1979, Hwang J.-N. et al., 'A Systolic Neural Network Architecture for Hidden Markov Models'.

International Conference on Wafer Scale Integration, 23 Jan. 1990, San Francisco, USA, pp. 220–228, Ramaswamy R. et al., 'A Methodology for Wafer Scale Integration of Linear Pipelined Arrays'.

Proc. 24th. Asilomar Conf. on Signals, Systems, and Computers, IEEE, vol. 2, 5 Nov. 1990, California, USA, pp. 897–901, Dowling E. M. et al., 'A Hybrid VLSI System Architecture for Scientific, matrix, Image, and DSP Computations'.

Journal of VLSI Signal Processing, vol. 1, No. 3, Nov. 1989, Dordrecht NL, pp. 221–251, Hwang J.N., 'Parallel Algorithms/Architectures for Neural Networks'.

*Primary Examiner*—Krisna Lim
*Attorney, Agent, or Firm*—Staas & Halsey

[57] ABSTRACT

A parallel data processing system processes data by synchronously operating a plurality of data processing units (processor elements). It aims at reducing the overhead caused by the data transmission in a system, performing a matrix operation and a neurocomputer operation by making the best of its parallel processing method, and at using excess units for another operation when the number of units required for an operation is smaller than the number of the existing units. The parallel data processing system comprises a plurality of data processing units; a plurality of trays which store and transmit data, each connected to a data processing unit; a tray connection switching unit for changing the connection state of the data transmission path between trays, dividing data processing units into a plurality of groups, and performing an independent operation on each group; and a clock generator for synchronously operating a data transmission between trays and a data process in a data processing unit. Thus, the data are transmitted while the data are processed, so the data transmission time can be actually counted as zero.

16 Claims, 26 Drawing Sheets

DETAILED
ILLUSTRATION

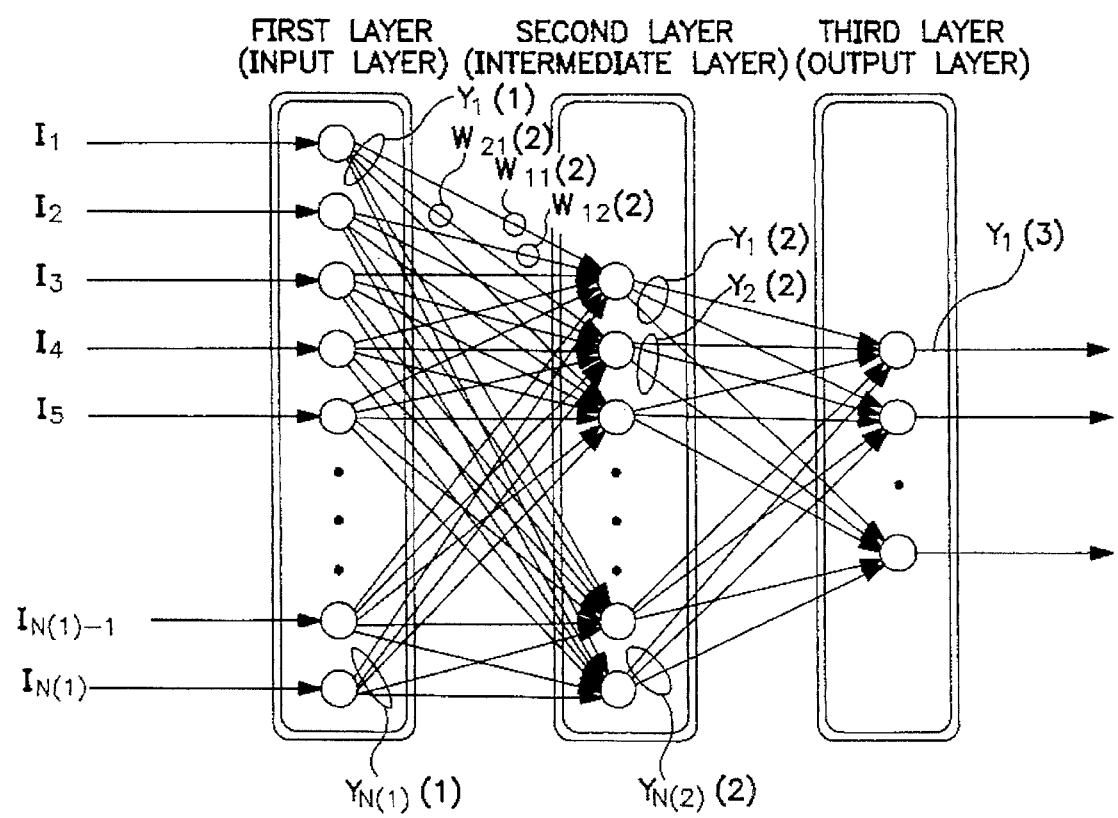
FIG. II

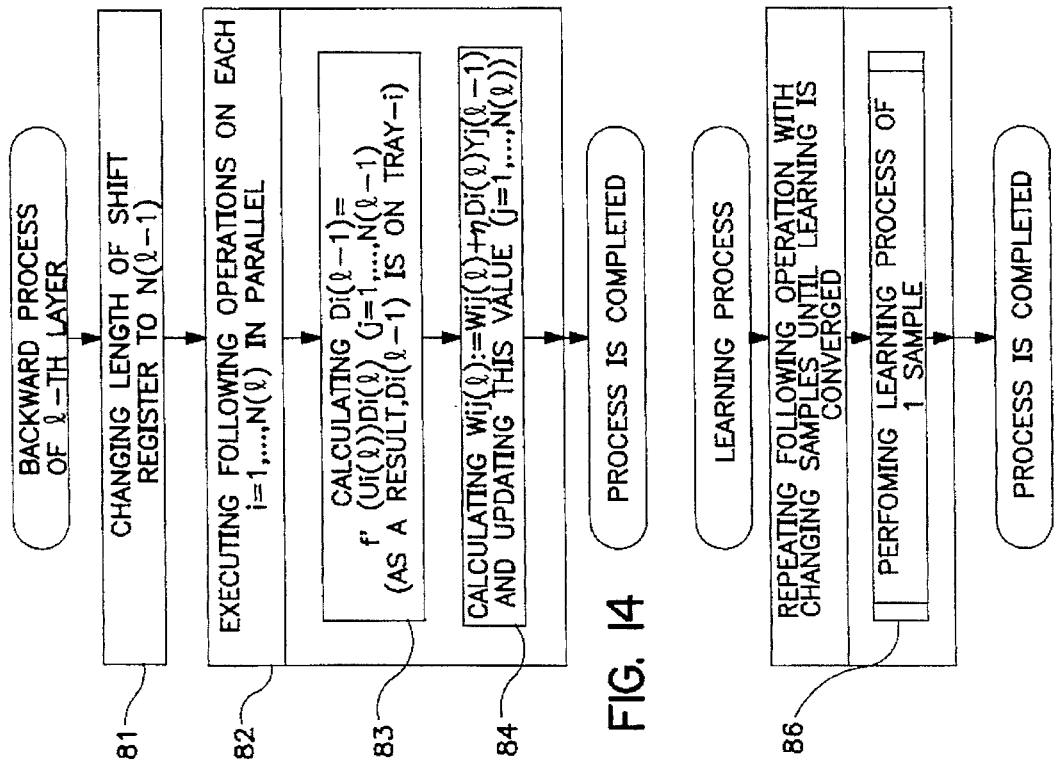
FIG. 14
FIG. 15
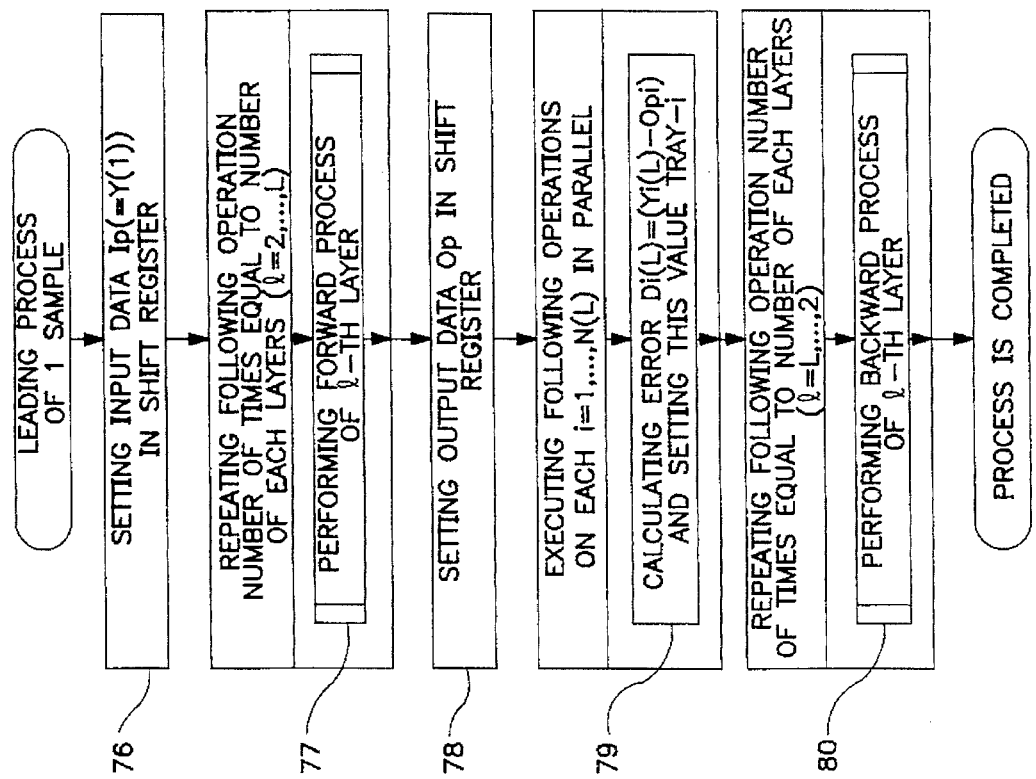
FIG. 13

PARALLEL DATA PROCESSING SYSTEM WHICH EFFICIENTLY PERFORMS MATRIX AND NEUROCOMPUTER OPERATIONS, IN A NEGLIGIBLE DATA TRANSMISSION TIME

This application is a continuation of application Ser. No. 07/853,429, filed Mar. 18, 1992, now abandoned.

BACKGROUND OF THE INVENTION

The present invention relates to a data processing system, and specifically to a parallel processor for processing data by synchronously using a plurality of data processing units.

With the increasing use of data processing systems and methods in many fields, an increasing amount of data are being processed. Specifically, a high-speed data processing technology is required in image and voice processing. A plurality of data processing units must be synchronously used to perform parallel data processes. Generally, an important concept in using a plurality of processing units is the number-of-units effect. This means that a data processing speed can be improved in proportion to the number of data processing units. In a parallel processing system, it is very important to know the most efficient number-of-unit effect.

The main reason for the deterioration of the number-of-units effect, other than the limit of the number of processing units for parallel use, is that the total processing time can be greatly prolonged because the data transmission time must be added to the time taken for the data processing operation. Therefore, to maximize the number-of-units effect, full use must be made of the capacity of a data transmission line. However, it is difficult to realize this.

Nevertheless, the number-of-units effect can be practically improved when processes are performed regularly.

First, data are provided in a systolic array, that is, cyclically. An operation is performed when the flow of two groups of data becomes synchronous. That is, the systolic array method refers to a parallel processing system in which processes are performed regularly. A one-dimensional systolic array method referred to as a ring systolic array method is a parallel data processing system for systolically processing data by synchronously using a plurality of data processing units. This system can be realized easily. Good examples of regular processes are matrix operations based on an inner product operation of a vector and parallel processes for outputting a result of a multiply-and-add operation of a neural network using a nonlinear function.

FIG. 1 (PRIOR ART) shows the principle configuration of the conventional common-bus-connection-type parallel system. In FIG. 1, 91 is a processor element, 4 is a memory, 93 is a common bus, 92 is a bus connected to the common bus, and 94 is an internal bus for connecting the processor element 91 to the memory 4 to be connected corresponding to a processor element. In this common-bus-connection-type parallel system, communication is made between processor elements (PE) through the common bus 93. Since one set of data is sent through the common bus in a specific time period, the communication through the common bus must be synchronized through the common bus.

FIG. 2 (PRIOR ART) is a flowchart of an operation for obtaining a matrix-and-vector product in the common-bus-connection-type parallel system. Each PE multiplies data X from another PE by W in the memory. The resultant product is added to Y. Therefore, first as shown in the flowchart, the content of the register in the i-th PE, that is, $Y_i$, is set to 0. Then, the following processes are repeated n times. That is, if $X_j$ is provided to the common bus 93, the i-th PE 91 multiplies the input from the bus 92 connected to the common bus 93 by the input (Wij) provided by the memory 4 through the internal bus 94, and adds the product to register $Y_i$ in the i-th PE 91. This process is repeated n times.

FIG. 3 (PRIOR ART) shows the principle configuration of the conventional ring systolic system. In FIG. 3, 120 is a processor element (PE). Each PE is connected by a cyclic bus 122. 121 is a memory for storing an element $W_{ij}$ of a coefficient. $W_{11}, W_{12}, \ldots, W_{33}$ are elements of a coefficient matrix. Generally, $W_{ij}$ is an ij-th element of the matrix. The coefficient matrix W is multiplied by a vector $x=(X_1, X_2, X_3)$ in the ring systolic method as follows.

FIG. 4 (PRIOR ART) shows the i-th internal configuration of a processor element (PE) 120. In FIG. 4, 123 is a multiplier, 124 is an adder, 125 is an accumulator (ACC). The memory 121 is of a FIFO (first-in, first-out) type, and is outputting $W_{ij}$, that is, an element in the j-th column and the i-th row of the coefficient matrix. The data in this FIFO is circulated at the next clock after it is outputted, and inputted again at the last stage of the memory through a bus 126. Therefore, as shown in FIG. 4, $W_{ii}, \ldots W_{ij-1}$ are already stored at the last stage after circulation.

Each element of a vector x is inputted through the cyclic bus 122. In this configuration, an element $X_j$ is inputted. The intermediate result of an inner-product operation of $W_{i1} \times X_1 + \ldots + W_{ij-1} \times X_{j-1}$ is stored in the accumulator 125, outputted from the accumulator 125, and inputted to one input of the adder 124. The multiplier 123 multiplies external $X_j$ by $W_{ij}$ outputted from the FIFO. The product is inputted to the other input of the adder 124. The addition result is added to the present content of the accumulator 125, and the result is stored in the same accumulator 125.

Repeating the above procedure gives an inner product obtained by multiplying the row vector of the i-th row in the coefficient matrix W by the vector x provided externally. A switch is provided to select whether the data $X_j$ are passed through to an external unit, or received to be inputted to the multiplier 123.

When a product is obtained by multiplying a matrix w by a vector x using the above described PE, a PE-1 first multiplies $W_{11}$ by $X_1$ as shown in FIG. 3, $X_2$ comes through a PE-2 on the right at the next timing, and the multiplication $W_{12} \times X_2$ is performed since $W_{12}$ is outputted from the memory 121. Likewise, at the next clock, the product of the multiplication $W_{13} \times X_3$ is obtained, and the operation of multiplying the first row of a matrix by a vector x can thus be performed by the PE-1.

An operation of multiplying the second row by a vector is performed by the PE-2. That is, $W_{22}$ is multiplied by $X_2$. At the next clock cycle $W_{23}$ is multiplied by $X_3$, and at the next clock cycle $W_{21}$ is multiplied by $X_1$ which has returned cyclically. Likewise, an operation of multiplying the third row by a vector can be performed by multiplying $W_{33}$ by $X_3$, $X_{31}$ by the cyclic $X_1$, and $W_{32}$ by the cyclic $X_2$, and then obtaining an inner product.

In the above process, the operations of multiplying $W_{11}$ by $X_1$, $W_{22}$ by $X_2$, and $W_{33}$ by $X_3$ can be performed simultaneously. However, as shown in FIG. 14, a shift in the arrangement of the coefficient matrix elements is required to perform the simultaneous operation. In the ring systolic array method, a data transmission line can be used efficiently and a desirable number-of-units effect can be obtained by sychronously transmitting data between each PE and performing data processes at each PE.

FIG. 5 (Prior Art) shows a combination of configurations of the ring systolic system shown in FIG. 3 and the combination comprises cyclic buses 122-1, 122-2 and 122-3. In this configuration, a serial matrix can be multiplied by a vector. Since the processes in the systolic array method can be performed regularly, the capacity of a data transmission line can be fully utilized, and the number-of-units effect can thus be greatly improved.

In a conventional parallel processing system using a common bus connection shown in FIG. 1, since PEs, that is, processing elements are connected through a common bus, only one set of data can be transmitted at one timing. Additionally, a connection through a common bus requires synchronization over the whole common bus.

Therefore, in the conventional common-bus-connection-type parallel processing system, only a few processes can yield a desirable number-of-units effect. Besides, when the number of connected PEs increases in a common bus connection process, the common bus must be very long. Therefore, it is hard to synchronize the whole common bus, and the system is not appropriate for a large-scale parallel process.

In the conventional ring systolic array method shown in FIG. 3, the number-of-units effect can be obtained by synchronously performing the data transmission between PEs and the data process by PEs. However, in this method, the data transmission between PEs and the data process by PEs must match in timing.

Additionally, in the conventional method, when the optimum number of data processing units is not equal to that of data storing units in the operation of multiplying an m-row-by-n-column matrix by a vector, for example, a PE not involved in an actual data process is required. That is, there can be a number of idle PEs, and the number-of-unit effect can be greatly deteriorated.

That is, a problem to be solved efficiently corresponds to a circuit configuration, and the number-of-units effect deteriorates if the size of a problem to be solved does not indicate an optimum value. In other words, problems which can achieve a desirable number-of-units effect are limited, so the method cannot be applied widely. Therefore, the conventional method is poor in flexibility and applicability, resulting in difficulties in realizing a high-speed data processing system capable of processing data to a reasonable extent.

SUMMARY OF THE INVENTION

The first object of the present invention is to reduce the overhead related to data transmission in the hardware configuration similar to that of the ring systolic method and the common-bus-connection-type parallel processing system.

The second object of the present invention is to provide a parallel data processing system for performing a matrix operation or neurocomputer operation by obtaining a desirable number-of-units effect in the optimum parallel process performed for calculating the product by multiplying an m-row-by-n-column (m×n) matrix by a vector.

The third object of the present invention is to provide a parallel processing system in which no processor elements indicate idle time by being used for other operations even when the number of processor elements necessary for an operation is smaller than the number of processor elements in the parallel processing system.

A feature of the present invention resides in a parallel data processing system comprising; a plurality of data processing units, a plurality of trays capable of storing and transmitting data, all or a part being connected one-to-one to the data processing unit, a plurality of tray connection switching means for changing the connecton state of a data transmission path between a plurality of the trays, for dividing a plurality of the trays and the data processing units into a plurality of groups, and for permitting each of the groups to perform an independent operation, and a clock generating unit for genertig a clock signal for synchronizing the data transmitting operation between the trays through the data transmission path and the data processing operation by the data processing unit.

BRIEF EXPLANATION OF THE DRAWINGS

FIG. 11 is for explaining the concept of the neural network using the neuron model shown in FIG. 10;

FIG. 13 is a flowchart of a learning process;

FIG. 14 is a flowchart of a backward process;

FIG. 15 shows a view for explaining the repetitive processes performed until a learning converges;

DETAILED OF THE PREFERRED EMBODIMENTS

Figure 6:
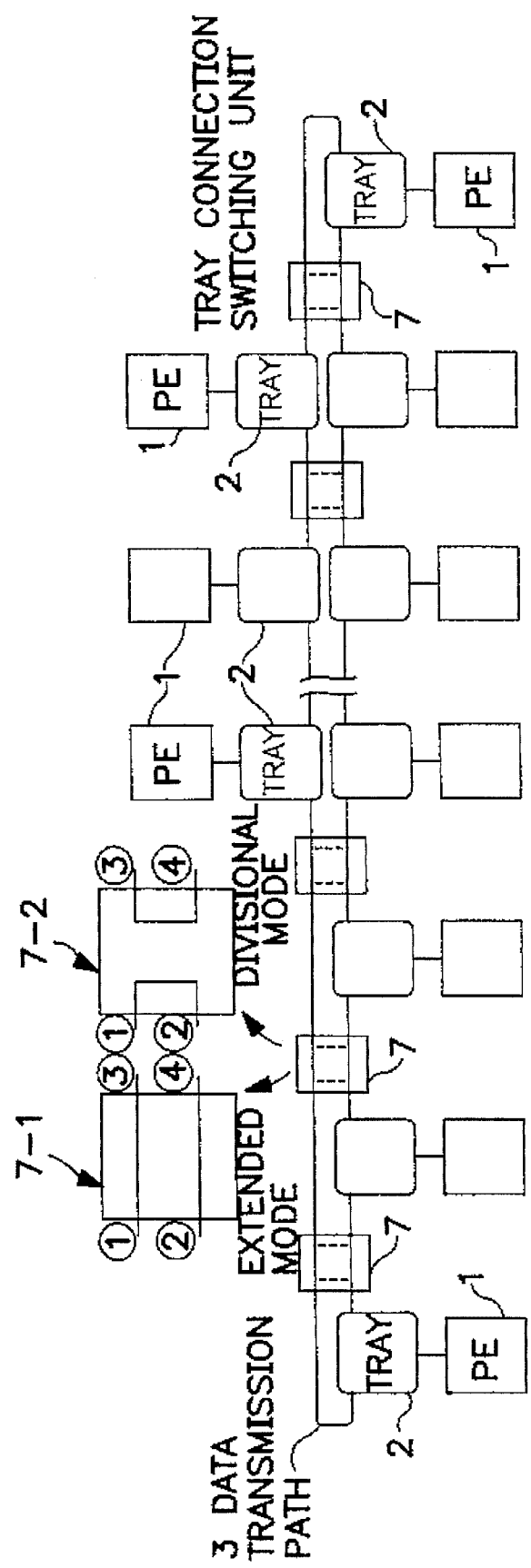
FIG. 6 shows the principle configuration of the present invention.

FIG. 6 is a block diagram for explaining the principle configuration of the present invention. In FIG. 6, a data processing unit 1 is a processor element (PE); a tray 2 stores and transmits data, and is totally or partially connected one-to-one to the data processing unit 1.

An inter-tray data transmission path 3 permits either a one-way data transmission counterclockwise or a two-way transmission clockwise or counterclockwise depending on usage.

A tray connection switching unit 7 changes the connection state of a data transmission path 3 between the trays 2, divides a plurality of data processing units 1 into a plurality of groups, and makes each of the groups separately perform an operation. In FIG. 6, the trays 2 may or may not be inserted between the tray connection switching unit 7 depending on the maximum number of necessary trays 2, but either configuration is acceptable.

"Tray" is a word adopted in the present invention to clarify the difference from the prior art technology. The original meaning of the word is a flat board to carry things on, and also refers to a tray or round table used in eating places such as cafeterias. Data to be processed are put on these trays and distributed to each of the data processing units, that is, processor elements.

In FIG. 6, each tray 2 is provided with elements of a vector to be processed, and the elements circulate in a cyclic shift register formed of a ring comprising the trays 2 and the data transmission path 3. During this process, each processor element sequentially receives data and performs a necessary process such as inner product operations on a vector.

The tray itself as a hardware is similar to a router used in a common parallel processing system. However, in this invention, the subject of an operation is the processor element, and a router is only for realizing communication between processors. In the present invention, a different word is used to conceptionally clarify that the subject for ruling the whole operation is a ring cyclic shift register, that is, a tray.

The tray 2 and the data transmission path 3 form a cyclic shift register formed of a ring together with the tray connection switching when the tray connection switching unit 7 is set in the extended mode, (explained later) and a cyclic shift is performed for the data on the shift register.

Figure 1:
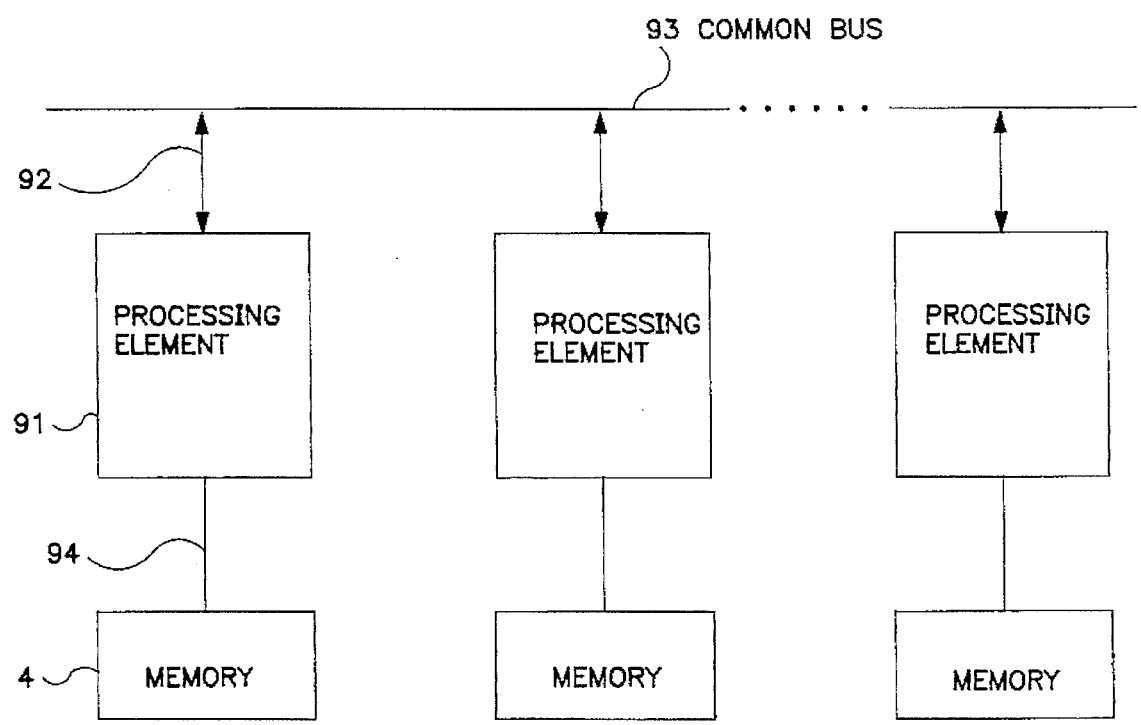
FIG. 1 (Prior Art) shows the principle configuration of the conventional common-bus-connection-type parallel system.
Figure 2:
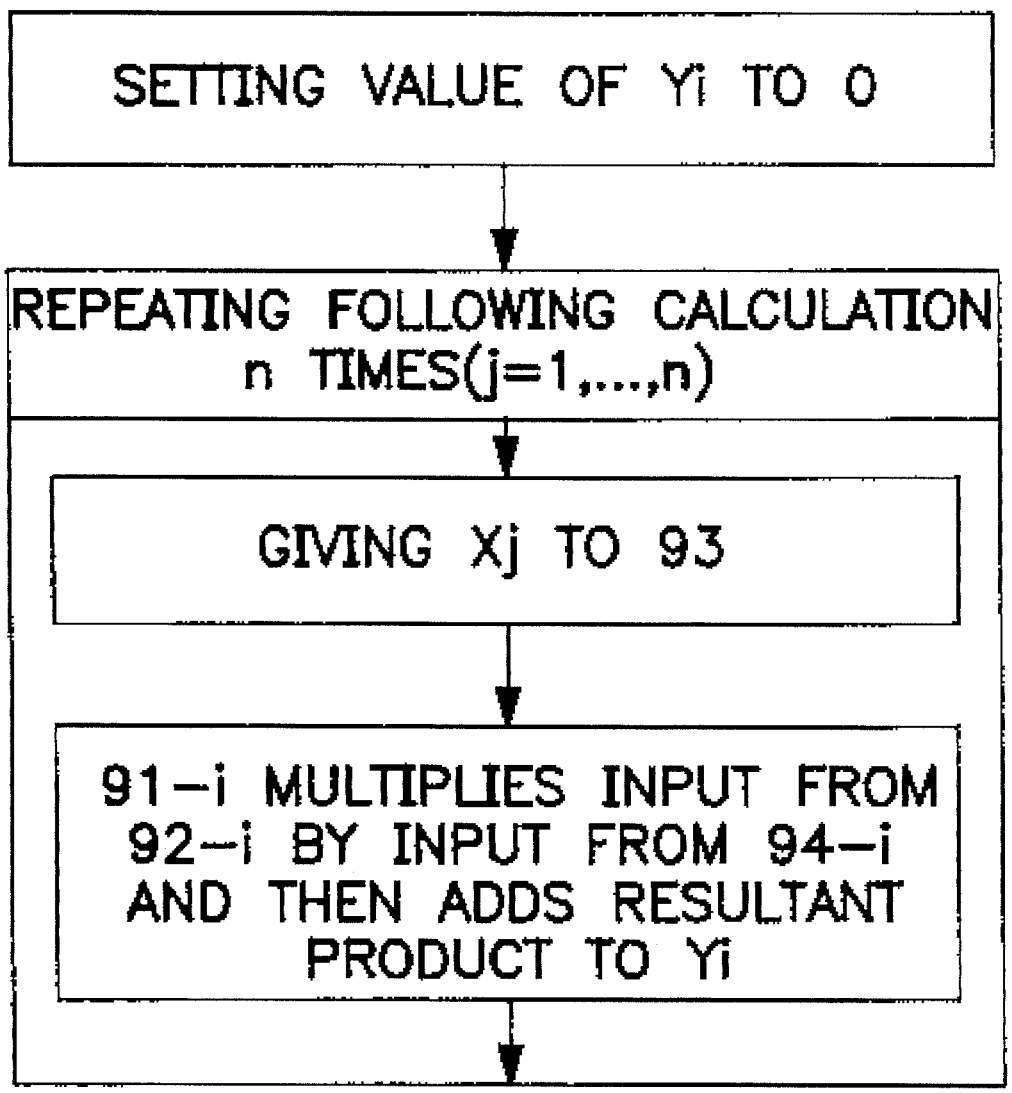
FIG. 2 (Prior Art) is a flowchart of an operation for obtaining a matrix-and-vector product in the common-bus-connection-type parallel system.
Figure 4:
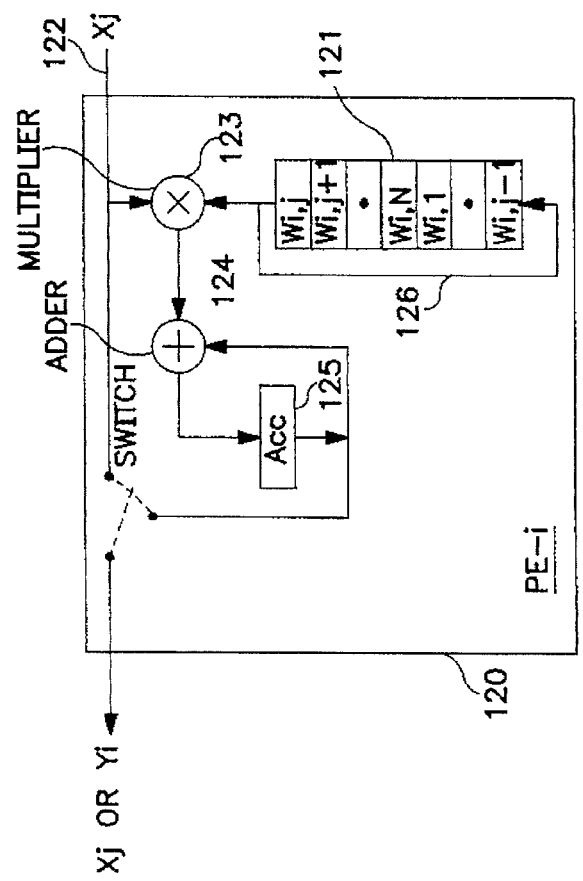
FIG. 4 (Prior Art) shows the internal configuration of a processor element (data processing unit)
Figure 3:
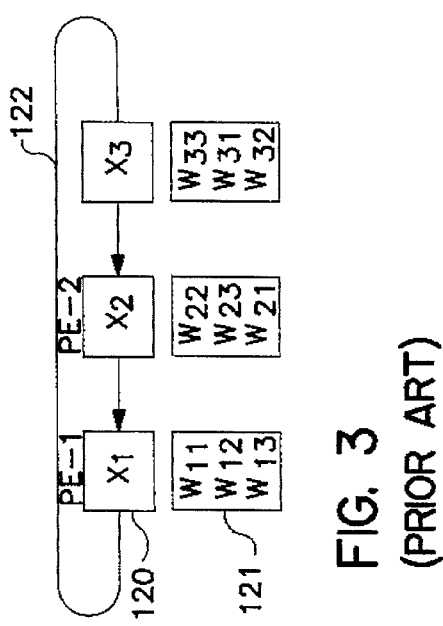
FIG. 3 (Prior Art) shows the principle configuration of the conventional ring systolic system.
Figure 5:
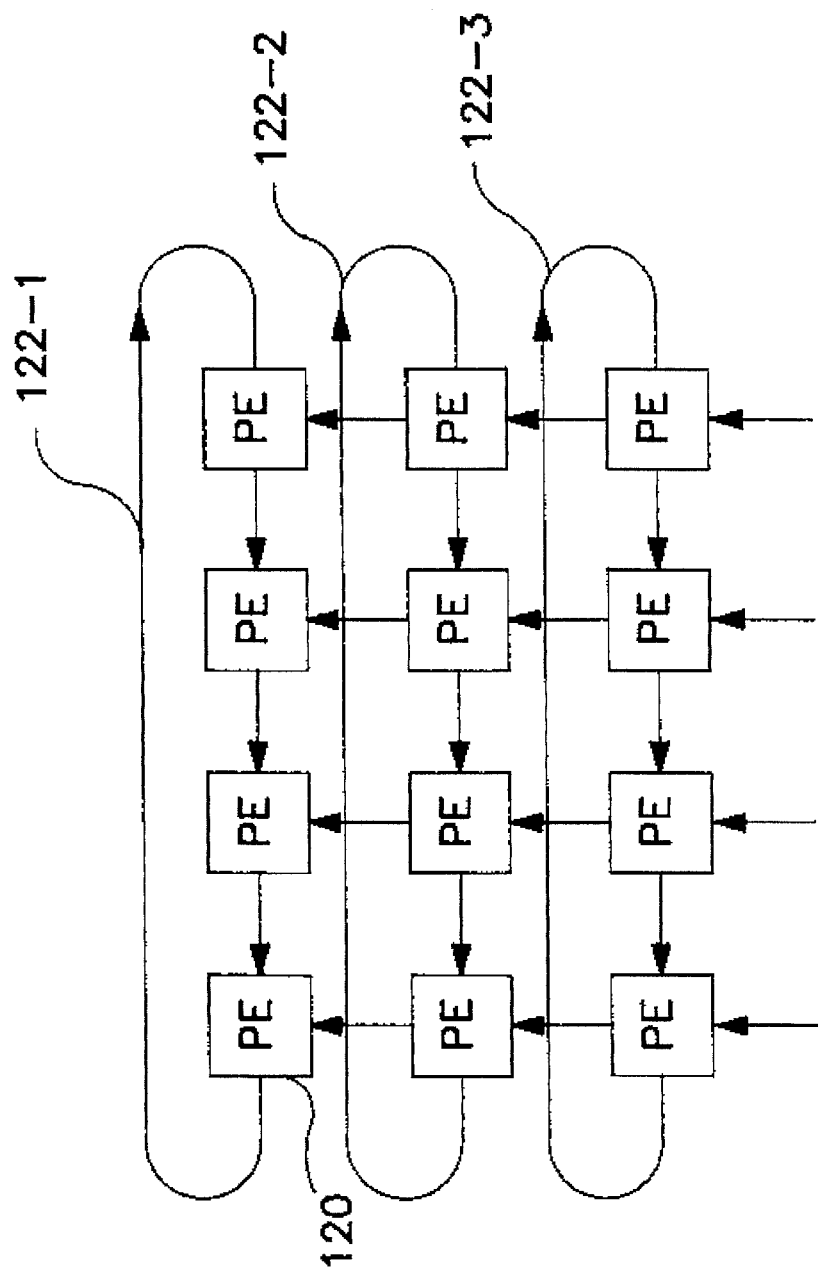
FIG. 5 (Prior Art) shows the combination of configurations of the ring systolic system shown in FIG. 3.

In the present invention, when a product is calculated by multiplying an m×n matrix A by a vector x of the number of elements n, the product can be obtained in a processing time proportional to "n" using m data processing units and n trays even though the number "m" of rows is smaller than the number "n" of columns or "m" is larger than "n", thus obtaining a desirable number-of-unit effect. That is, as shown in FIG. 4, the data processing unit multiplies inputted data by data in a memory when a value of an accumulator in the unit is "Y", adds the product to the value Y, and shifts the elements of the vector x between adjacent trays in the shift register. These operations are performed for a configuration comprising "m" data processing units 1 for performing multiplication of inputted data by memory data and accumulation of the multiplication results, that is, a multiply-and-add operation, and "n" trays 2. Repeating the above process "n" times performs a multiplication of the m x n matrix A by an n-dimensional vector using "m" data processing units in a processing time proportional to "n". In the present invention, unlike in the prior art technology, a desirable number-of-units effect can be obtained without a timing process even though "m" and "n" indicate different values by separating the data processing unit 1 from the trays 2 capable of storing data. Furthermore, in the present invention, a data transmission between the trays 2 and computation process by the data processing unit 1 are performed concurrently. Normally, since the data processing operation by the data processing process takes longer than the data transmission, the data transmission time can be completely hidden by the data processing time. That is, the data can be transmitted while the data are being processed, thus successfully shortening the total processing time.

The system's performance can be greatly deteriorated if an operation needs only about 32 PEs when the system is provided with about 256 data processing units, that is, processor elements (PE) 1 in FIG. 6. Therefore, in the present invention, the connection state of the data transmission path between trays can be changed by the tray connection switching unit 7, and the PEs 1 and the trays 2 are divided into a plurality of groups such that each of the groups performs an independent operation.

The tray connection switching unit 7 switches the data transmission path between the trays 2 either to the extended mode in which the path is set to the extended state or to the divided mode in which the PE 1 is divided into a plurality of groups.

As shown in FIG. 6, the tray connection switching unit 7 comprises a first terminal ①, a second terminal ②, a third terminal ③, and a fourth terminal ④. In the extended mode, the first terminal ① and the third terminal ③ are internally connected to each other, and the second terminal ② and the fourth terminal ④ are internally connected to each other. In the divisional mode, the first terminal ① and the second terminal ② are internally connected to each other, and the third terminal ③ and the fourth terminal ④ are internally connected to each other.

Thus, in the extended mode, the data from the right (or left) tray 2 of the present switching unit 7 are transmitted to the left (or right) tray 2. In the divisional mode, the data from the left tray 2 of the present switching unit 7 (or the data headed for the right tray 2) are transmitted to the right (or from the right), and the data from the right tray 2 (or data headed for the left tray 2) are transmitted to the left (or from the left). That is, in this case, the cyclic shift register comprising the tray 2 and the data transmission path 3 is divided to the right and the left parts.

The data processing unit 1 and the tray 2 shown in FIG. 6 transmit data to each other, and the following transmission processes are individually synchronized.

(1) the data transmission in which data are shifted to each of the trays 2 in the shift register, (2) the data transmission between the tray 2 and the data processing unit 1, and (3) the data processing operation by the data processing unit 1.

In the present invention, if the trays 2 in 32 units form one cyclic shift register, and a predetermined switching unit 7 is selected in the above described divisional mode, the cyclic shift register comprising a total of 256 trays 2 is divided into eight cyclic shift registers. Thus, eight operations can be performed in parallel.

Figure 7:
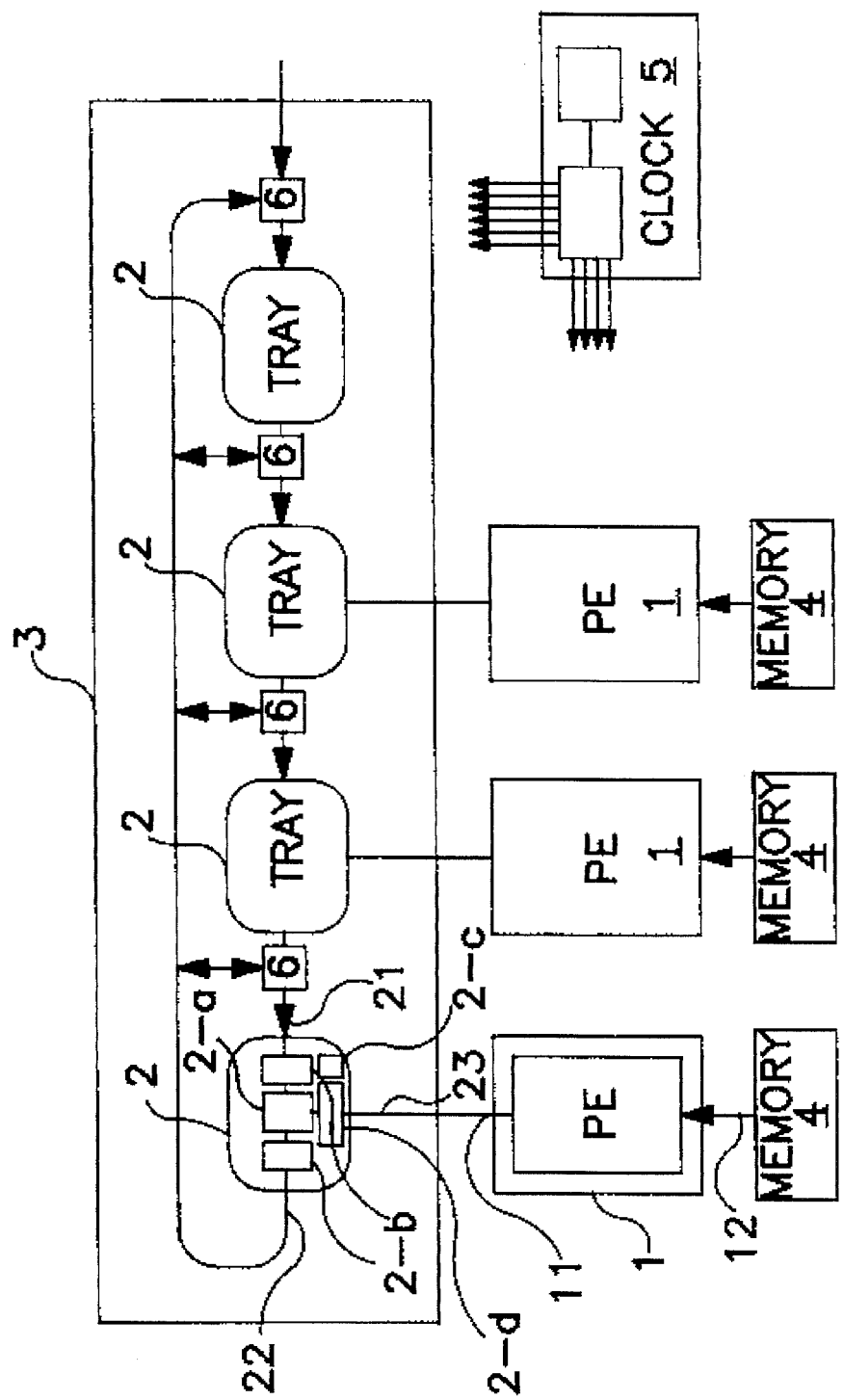
FIG. 7 shows the configuration of the parallel data processing system of the present invention.

An embodiment of the present invention is described below by referring to the attached drawings. For convenience, a parallel data processing system in the same state as state in which the tray connection switching unit 7 shown in FIG. 6 is set to the extended mode is explained in detail. FIG. 7 is a configurational block diagram for explaining the parallel data processing system of the present invention. In FIG. 7, parts the same as in FIG. 6 are assigned the same identification number. 11 is the first input of the data processing unit 1, 12 is the second input of the data processing unit 1, 21 is the first input of the tray 2, 22 is the first output of the tray 2, and 23 is the second output of the tray 2. 4 is a memory, 5 is a clock provider, and 6 is a connectors.

The connector 6 is a switch, unlike the tray connection switching unit 7 shown in FIG. 6. It shortens the data transmission path to reduce the number of data processing units 1 and trays 2 used in an operation by inputting external data to the cyclic shift register comprising the tray 2 and the data transmission path 3, and by outputting to the left the data inputted as indicated by the downward arrow. If the path is shortened, trays and the data processing units to the right of the skipped connector 6 are invalid, and an operation is performed by the left tray and the data processing units.

In the system shown in FIG. 7, the first object of the present invention, that is, to reduce the overhead attributable to data transmission, and the second object, that is, to obtain a desirable number-of-units effect in a calculation of multiplying an m×n matrix by a vector, is achieved. Since the operation is almost the same as that for FIG. 6, the detailed explanation is given below by referring to FIG. 8, which illustrates a practical operational example of the system shown in FIG. 7.

Figure 8:
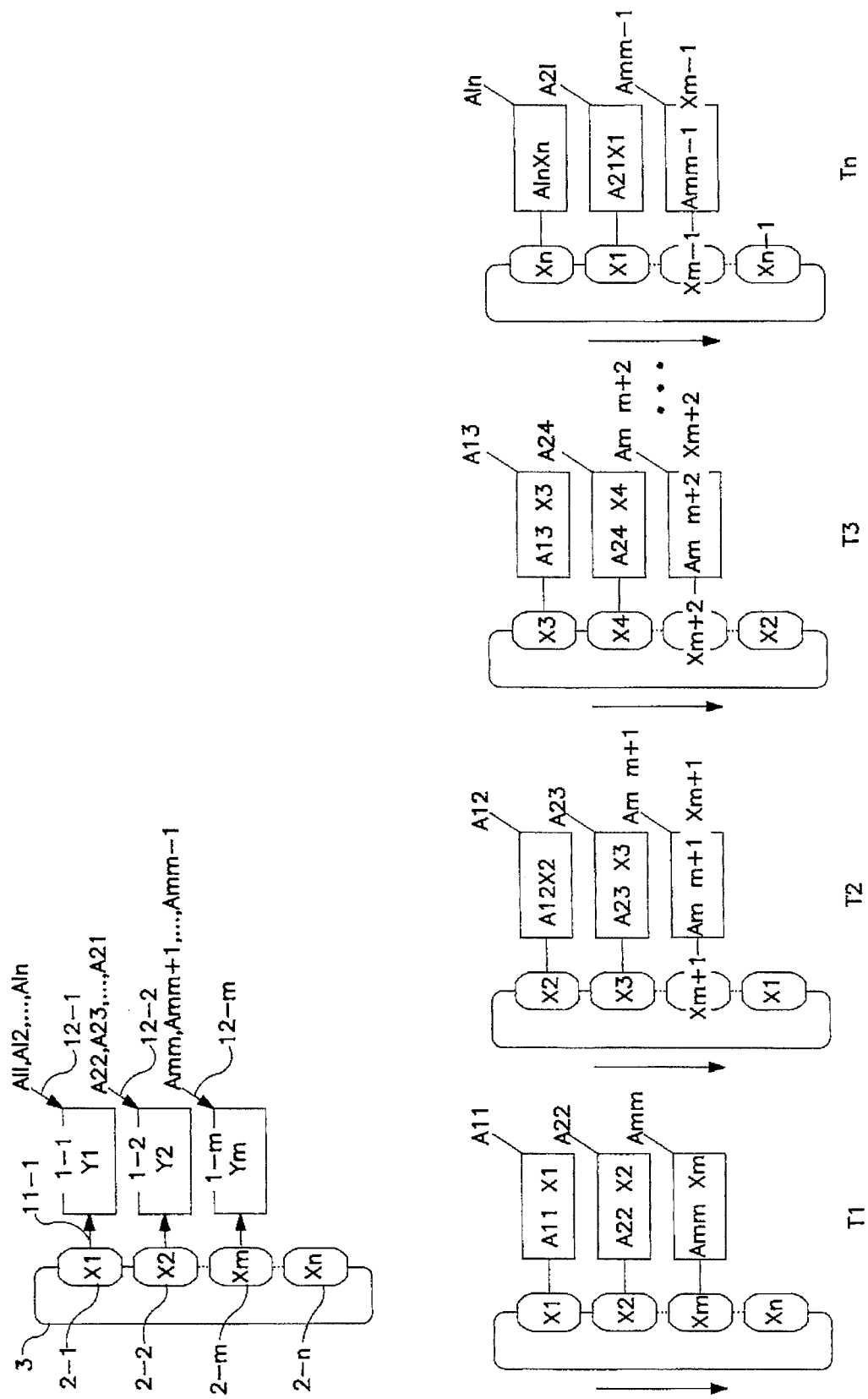
FIG. 8 is a block diagram for explaining the operation of the system shown in FIG. 7.

In FIG. 8, the data $X_1-X_n$ in the tray 2 are elements of the vector x, and total n elements. The number of data processing units is m, as shown in FIG. 4, each having an accumulator indicating $Y_1, Y_2, \ldots, Y_m$, where m<n.

There are m×n elements ($A_{11}-A_{mn}$) of the m×n matrix. In a data processing unit 1-1, the first row $A_{11}, A_{12}, \ldots, A_{1n}$ of a coefficient matrix is inputted synchronously with the clock through an input bus 12-1.

$A_{22}, A_{23}, \ldots, A_{21}$ are sequentially applied to a data processing unit 1-2 at systolic operation timing. Likewise, $A_{mm}, A_{mm+1}, A_{mm-1}$ are applied to a data processing unit 1-m at each timing.

At the timing $T_1$, trays 2-1, 2-2, ..., 2-n contain $X_1, X_2, X_m, \ldots, X_n$ as shown in FIG. 8, and elements $A_{11}, A_{22}, \ldots, A_{mm}$ of the coefficient matrix are applied to the units 1-1, 1-2, ..., 1-m. Therefore, at this timing, the data processing unit 101 multiplies $A_{11}$ by the data $X_1$ in a tray 2-1, the data processing unit 1-2 multiplies $X_2$ in the corresponding tray 2-2 by $A_{22}$ provided by a memory, and the data processing unit 2-m multiplies $A_{mm}$ by $X_m$.

The processes above are performed at the timing $T_1$ shown in FIG. 8. That is, in the timing at which a sum of products is calculated, a bus 11-1 contains $X_1$, a bus 12-1 contains $A_{11}$, a bus 11-2 contains $X_2$, a bus 12-2 contains $A_{22}$, a bus 11-3 contains $X_3$, a bus 12-3 contains $A_{33}$, a bus 11-m contains $X_m$, and a bus 12-m contains $A_{mm}$. Therefore, a product is obtained according to the timing $T_1$ as shown in FIG. 8.

Since the value in an accumulator Y is 0 at this time, 0 and the product are added as an intermediate result of the inner product. When the multiply-and-add operation is calculated, a sifting operation is started, thus entering the timing $T_2$ shown in FIG. 8. After the shift, the tray 2-1 contains $X_2$, the tray 2-2 contains $X_3$, and the tray 2-m contains $X_{m+1}$. Elements $A_{12}, A_{23}$, and $A_{mm+1}$ of the coefficient matrix are inputted corresponding to the data processing unit 1-1, ..., 1-m.

Therefore, at the timing $T_2$, the product of the multiplication $A_{12} \times X_2$ obtained at the timing $T_2$ is added to the value Y in the accumulator. Accordingly, in the unit 1-1, the product of the multiplication $A_{12} \times X_2$ is added to the product of the multiplication $A_{11} \times X_1$ obtained at the timing T1, and the result is stored in the accumulator. Likewise, in the unit 1-2, the product $A_{23} \times X_3$ added to the previous result $A_{22} \times X_2$ is stored in the accumulator. Similar operations are performed in the unit 1-m. Then, after the next shift, the process enters the timing $T_3$. The tray 2-1 contains $X_3$, the tray 2-2 contains $X_4$, the tray 2-m contains $X_{mm+2}$, and the tray 2-n contains $X_2$, and the operation at $T_3$ shown in FIG. 8 can thus be performed.

Figure 9A:
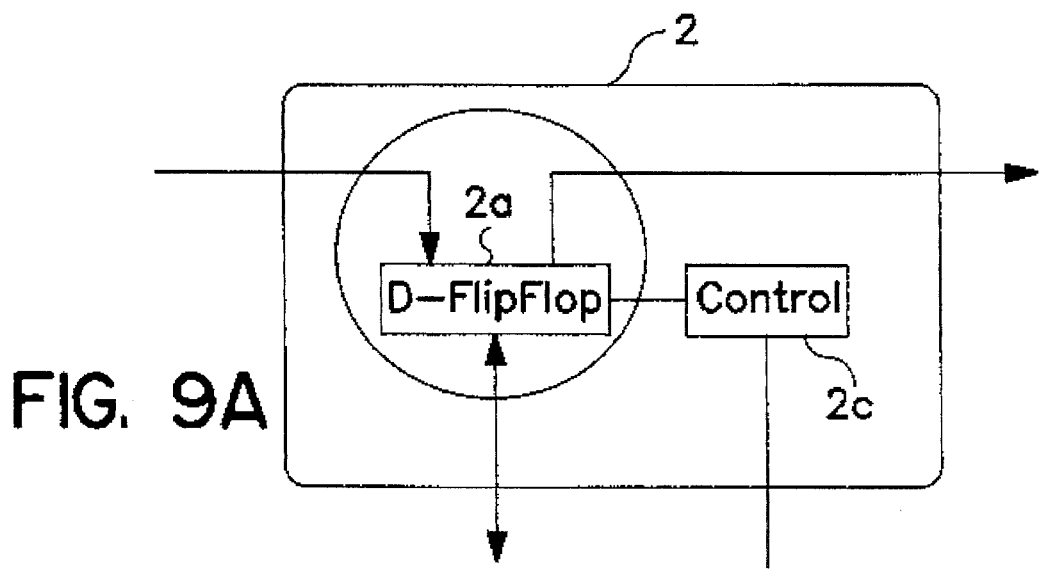
FIGS. 9A and 9B show the configuration of an embodiment of the tray.
Figure 9B:
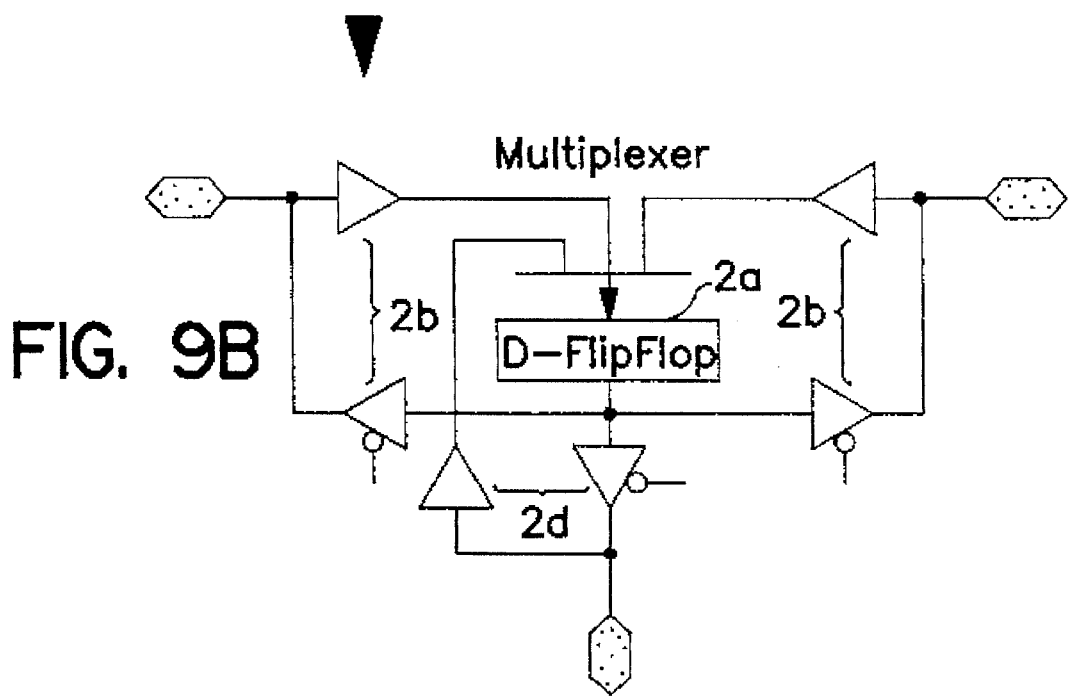

FIG. 9 shows the configuration of the tray 2 shown in FIG. 7. The drawing FIG. 9B illustrates in detail the part enclosed by the circle shown in the drawing FIG. 9A. 2a in FIG. 9 is a tray data storing circuit; 2b is a tray data transmission circuit; 2c is a controller; 2d is a data input/output circuit connecting PEs.

Basically, a tray is a latch circuit and comprises a D-FF 2a and a control circuit 2c for controlling writing, reading, and addressing.

FIG. 9B shows a more detailed configuration of the tray 2 in which the input of a D-Flipflop is selected by a multiplexer and the direction of data flow is controlled by a buffer and a tri-state buffer.

As shown in FIG. 9B, any data from the right tray shown in FIG. 7, the left tray shown in FIG. 7, or from the data processing unit 1 can be set in the data storing circuit 2a. The data from the data storing circuit 2a are applied to the left tray shown in FIG. 7, the right tray shown in FIG. 7, and to the data processing unit 1.

The parallel data processing system can be realized as described above. According to the parallel data processing system of the present invention, a plurality of sets of data can be parallelly processed and utilized in the following processes.

Logical data processes using conventional von Neumann type computers cannot flexibly process various patterns of data as human beings do. Accordingly, a neurocomputer is being studied and developed, which will utilize a calculation principle quite different from that of conventional computers.

One of the main features of a neurocomputer is its learning function, and one of its widely used learning rules is an error back propagation rule. However, if the error back propagation rule is applied to a large-scale neural network or a large volume of learning data, it takes a very long time to converge the data.

The above parallel data processing system is used in learning based on the error back propagation rule.

Figure 10:
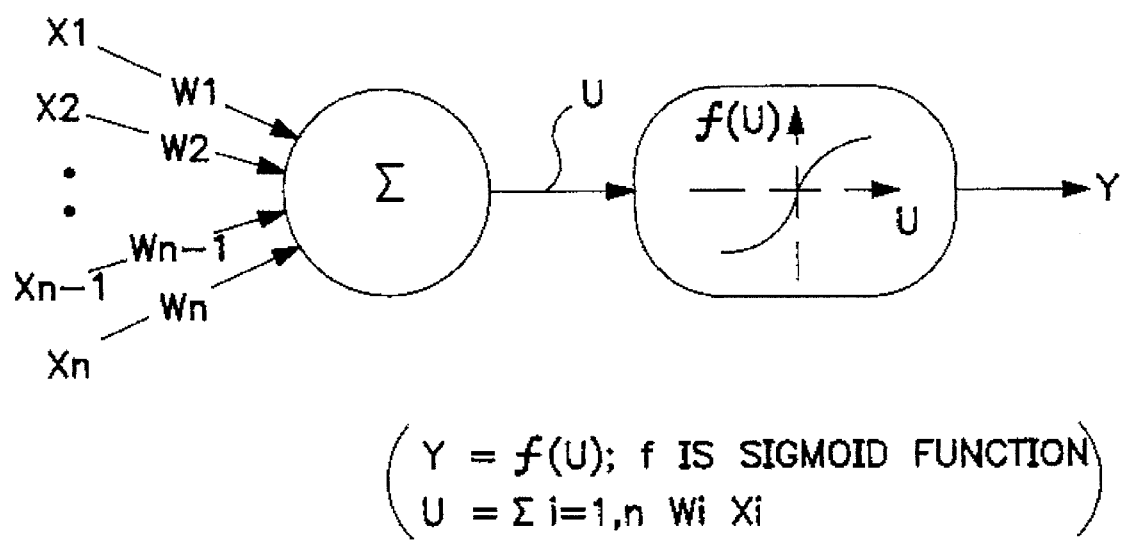
FIG. 10 shows the configuration of a neuron model.

FIG. 10 shows the configuration of a neuron model which is a basic element of a neurocomputer. The neuron model multiplies inputs $X_1, X_2, \ldots, X_n$ by weight values $W_1, W_2, \ldots, W_n$ of a synapse connection, and then calculates their sum to be stored as an internal state value U. The value U is provided with a nonlinear function f, and the resultant value is an output Y. An S-type sigmoid function shown in FIG. 10 is generally used as a nonlinear function f.

FIG. 11 shows a concept of a multiple layered neural network forming a neurocomputer. The neural network comprises three layers (an input layer, an intermediate layer, and an output layer) using a plurality of neurons, as shown in FIG. 10.

The input layer, that is, the first layer, receives input signals $I_1, I_2, \ldots, I_{N(1)}$. Each of the units (neurons) in the second intermediate layer is connected to all the neurons in the first layer. The tie-branches are synapses which are given a respective weight value $W_{ij}$. Each of the units (neurons) in the output layer, that is, the third layer, is also connected to all the neurons of the intermediate layer. The outputs are drawn to the outside.

In this neural network, an error between a teaching signal corresponding to an input pattern signal applied to the input layer at each learning time and an output signal from the output layer are obtained. Weight values between the intermediate layer and the output layer and between the first layer and the second layer must be determined such that the error can be the smallest possible value. This algorithm is called a generalized delta rule.

When weight values are determined according to the generalized delta rule and stored to be used in presuming a pattern recognition, etc., an output signal corresponding to the pattern is outputted from the output layer if an imperfect pattern similar to a trained pattern to be recognized is applied to a unit of the input layer of the first layer, an output signal corresponding to the applied pattern is outputted from the output layer, and the resultant signal indicates a signal similar to the teaching signal corresponding to the pattern provided at the time of learning. If the difference between the output signal and the teaching signal is very small, the imperfect pattern is recognizable.

In FIG. 11, N(1) indicates the number of neurons in the first layer. Generally, the output of each neuron in the first layer that is, the input layer, is equal to its input. Therefore, no actual processes are required at all. FIG. 12 is a flowchart for explaining a normal operation for recoginzing a pattern.

Figure 12A:
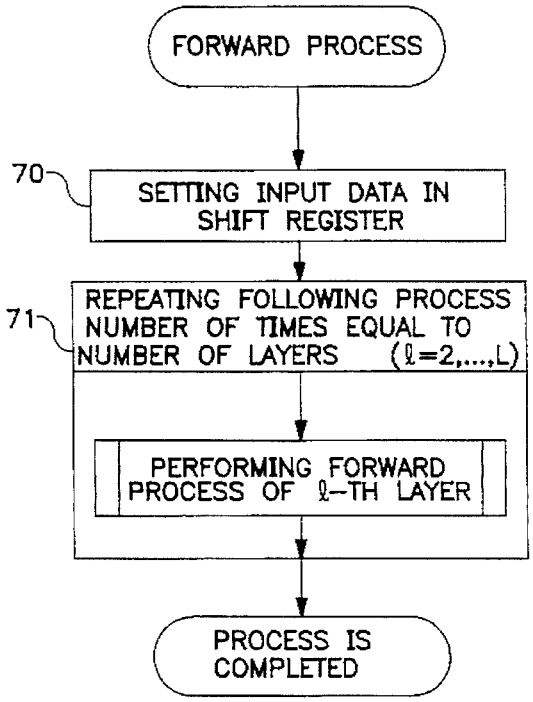
FIGS. 12A and 12B are flowcharts of a forward process.

FIG. 12A is a flowchart of the whole forward process.

In the forward process in the network shown in FIG. 11, a weight coefficient of a tie-branch between layers is determined. When the network shown in FIG. 11 is realized using a neurocomputer, the following processes are performed. In the basic operation of the forward process using the neuron model shown in FIG. 10, inputs are multiplied by weight values and all the products are added to obtain the sum U. Then, a nonlinear function is applied to the sum U. This operation is performed in each layer.

Figure 12B:
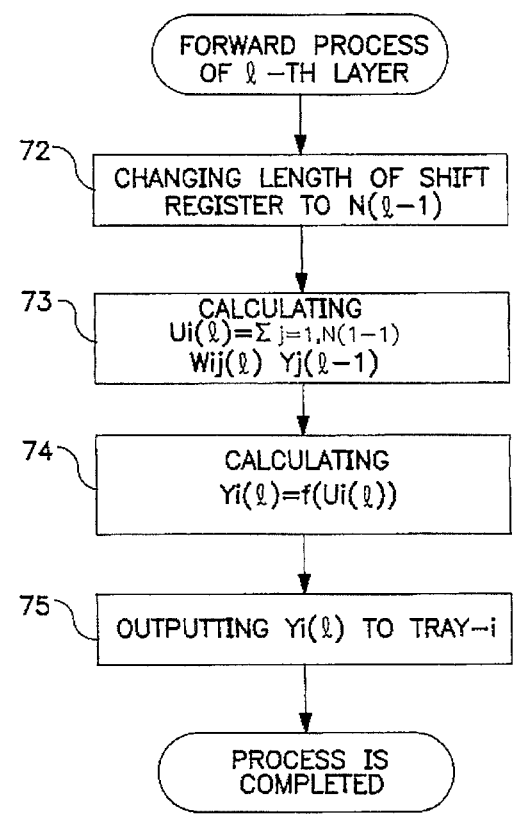

First, in step 70 shown in FIG. 12A, input data, that is, data from $I_1$ to $I_{N(1)}$, are set in the tray 2 in the shift register comprising the tray 2 and the data transmission path 3. After representing by L the number of layers including an input layer, the following processes are repeated for each of the L−1 layers in step 71. For example, if L is 3, the processes are repeated twice. The forward process for one layer is repeated and then the process is completed. The forward process for one layer is indicated in FIG. 12B.

The intermediate layer is the second layer, the input layer is the first layer, and a value l equals 2. In step 72, the length of the shift register (the number of trays) is set to N(l−1). That is, since l=2, the length of the shift register is set to N(1), that is, the number of the input layer units.

In step 73, a neuron model is processed in the intermediate layer. An index j indicates the number of the units 1 to the number N (1). $W_{ij}$ (l) indicates a weight coefficient of the connection between the input layer and the intermediate layer. That is, l=2. $Y_j$ (l−1) indicates the output from the j-th unit in the input layer. i indicates the i-th unit in the intermediate layer. The internal state $U_i$ of the i-th unit is calculated by multiplying the output $Y_j$ of the input layer unit, that is, the j-th Y, by the weight $W_{ij}$ and obtaining the sum of the products.

In step 74, the internal state $U_i$ (2) of the i-th unit of the intermediate layer is applied to a nonlinear function, that is, a sigmoid function, to provide $Y_i$ (2). The multiply-and add calculation in step 73 is performed by the data processing unit 1, and the calculation using a sigmoid function can be performed by an independent unit.

In step 75, the output $Y_i$ (2) of the i-th unit of the intermediate layer is outputted to the i-th tray. Thus, the process terminates.

The above described forward process is performed on the intermediate and output layers. Thus, the forward process for each layer terminates. That is, the process required for a simulation of a neuron itself is the operation represented by the expression shown in FIG. 10. The operation includes the multiply-and-add operation of multiplying weights by elements of input vectors and the calculation for the results using a sigmoid function. The calculation using a sigmoid function can be realized by for example an independent unit for a sigmoid function operation.

Therefore, a process for one layer in a network means performing the operation for a neuron itself for each of the neurons in the layer as shown in FIG. 11. Therefore, the vector U of the product obtained by multiplying the matrix W (l)=($W_{ij}$ (l)), where the matrix contains weight coefficients, by the vector x (l) =($X_j$ (l)), where the vector contains inputs to the layer, can be calculated as follows.

$$\begin{aligned} U(l) &= [U_i(l)] \\ &= \sum_{j=1}^{N(1)} W_{ij}(l) X_j(l) \end{aligned}$$

The sigmoid function operation can be performed by inputting each element of a product vector, that is, $U_i$ (l), to each of the exclusive sigmoid function processing units and outputting the corresponding function $Y_i$ (l)=f ($U_i$ (l)). If there is a following layer, that is, an (l+1)th layer, each function output $Y_i$ (l) is written into each tray. In the process of the (l+1)th layer, the output $Y_i$(l) is used as an input and the above procedure is repeated.

The learning operation using a neurocomputer, that is, a back propagation algorithm, is described below.

FIG. 13 is a learning process flowchart. A learning using a neurocomputer means modifying the weight value of each neuron until the network establishes a desired input/output relationship.

This learning operation is provided with a plurality of pairs comprising a desired input signal vector and a teaching signal vector. Then, one of the pairs is selected, and the input signal $I_p$ of the selected pair is applied to the learning network. Next, the output of the network in response to the input signal $I_p$ is compared with the correct output signal, that is, the teaching signal $O_p$ corresponding to the input signal. The difference between these two signals is referred to as an error. The weight value of each neuron can be modified according to the error and the values of the input/output signals.

This process is repeated for each of the elements until the learning converges. That is, the learning process is repeated for each of the input patterns. In this weight-modifying process referred to as a backward process, an error obtained at the output layer is corrected for each layer and the result is propagated toward the input layer, that is, in the direction opposite to the normal signal direction. This is the algorithm of the back propagation method.

The error D is recursively defined as follows. $D_i$ (l) is an error which is propagated backward from the i-th neuron in the l-th layer. L is the number of layers in the network.

$$Di(L) = f'(U_i(L))(Y_i(L) - O_{Pi}) \quad (1)$$

(last layer)

$$D_i(l-1) = f'(U_i(l-1)) \quad (2)$$

$$\sum_{j=1}^{N(l)} W_{ij}(l) D_j(l)$$

$$(l = 2, \ldots, L)$$

$$(j = 1, \ldots, N(l))$$

where f'(U) is the value of the differential coefficient f'(X) of the sigmoid function f(X) when X =U. If, for example, $$f(X) = \tanh X \quad (3)$$

then $$\begin{aligned} f'(X) &= d(\tanh X)/dX = 1 - \tanh^2 X \\ &= 1 - f^2(X) \end{aligned} \quad (4)$$

This gives the following expression:

$$f'(U\ i) = 1 - f^2(U\ i) = 1 - Y\ i^2 \quad (5)$$

A weight value is updated according to $D_i$ and $Y_i$ as follows. Basically, the following expression is used. Here, η indicates a scaling factor of width in which is used for updating a weight value. If it is too small, it takes a longer time to converge a learning. If it is too large, no convergence is attained. t means the number of weight value updatings.

$$W_{ij}(l)^{(t+1)} = W_{ij}(l)^{(t)} + \Delta W_{ij}(l)^{(t)} \quad (6)$$

$$\Delta W_{ij}(l)^{(t)} = \eta D_i(l) Y_j(l-1) \ (l=2, \ldots, L) \quad (7)$$

However, the following expression is frequently used. This is obtained by passing $\Delta W_{ij}(l)^{(t)}$ in the expression (7) through the first order digital low pass filter, and α is a parameter for determining the time constant of the filter.

$$\Delta W_{i,j}(l)^{(t+1)} \eta = D_i(l) Y_j(l-1) + \alpha W_{i,j}(l)^{(t)} \quad (8)$$

This operation required in the backward process is performed as a vector-and-vector operation or a matrix-and-vector operation. The most important calculation therein is a multiplication of the transposed matrix ($W^T$) of the weight matrix W having weight values of neurons in each layer by the above error vector $D_j(l)$. In the general case where there are a plurality of neurons in a layer, the error is represented by a vector.

The flowchart shown in FIG. 13 is described below. The forward process and the backward process for the network of the L layer are performed. First, the input data $I_p$ are set in the shift register, and the forward process for one layer is performed in step 77.

Since the process is performed for each layer, the forward process is repeated a number of times equal to the number of layers except the input layers. Then, the output data $O_p$ is outputted to be set in the shift register in step 78. The process of step 79 is parallelly performed a number of the times equal to the number of output layer units. Thus, the error $D_i(L)=Y_i(L)-O_p(i)$ is calculated and set in the i-th tray. Then, the backward process is performed in step 80 for each layer from the output layer to the input layer.

FIG. 14 indicates the backward process. Concerning the l-th layer, since the number of the layer units is N(l), the length of the shift register is set to N(l) in step 81. Then, the following process is parallelly performed in step 82 for each of the units in the previous layer. That is, the operation of the above expression (2) is performed in step 83. It must be noted that the weight value is $W_{ji}(l)$, which indicates an element of the transposed matrix (W) of the weight matrix.

In step 84, the above expressions (6), (7), and (8) are calculated to update the weight values. In step 85, the obtained error $D_i(l-1)$ is outputted to the i-th tray. This is necessary for the operation in step 84 in order to calculate the next error.

FIG. 15 is a flowchart for explaining the repetition of the forward and the backward processes until the learning converges. Several processes are performed, for example, for smooth modification of weight values to stabilize the learning and update the weight values. These processes include multiplication of a matrix by a scalar and addition/subtraction between matrices, and they can be performed by the present neurocomputer.

An independent sigmoid function unit can be realized in software as well as in hardware.

Figure 16:
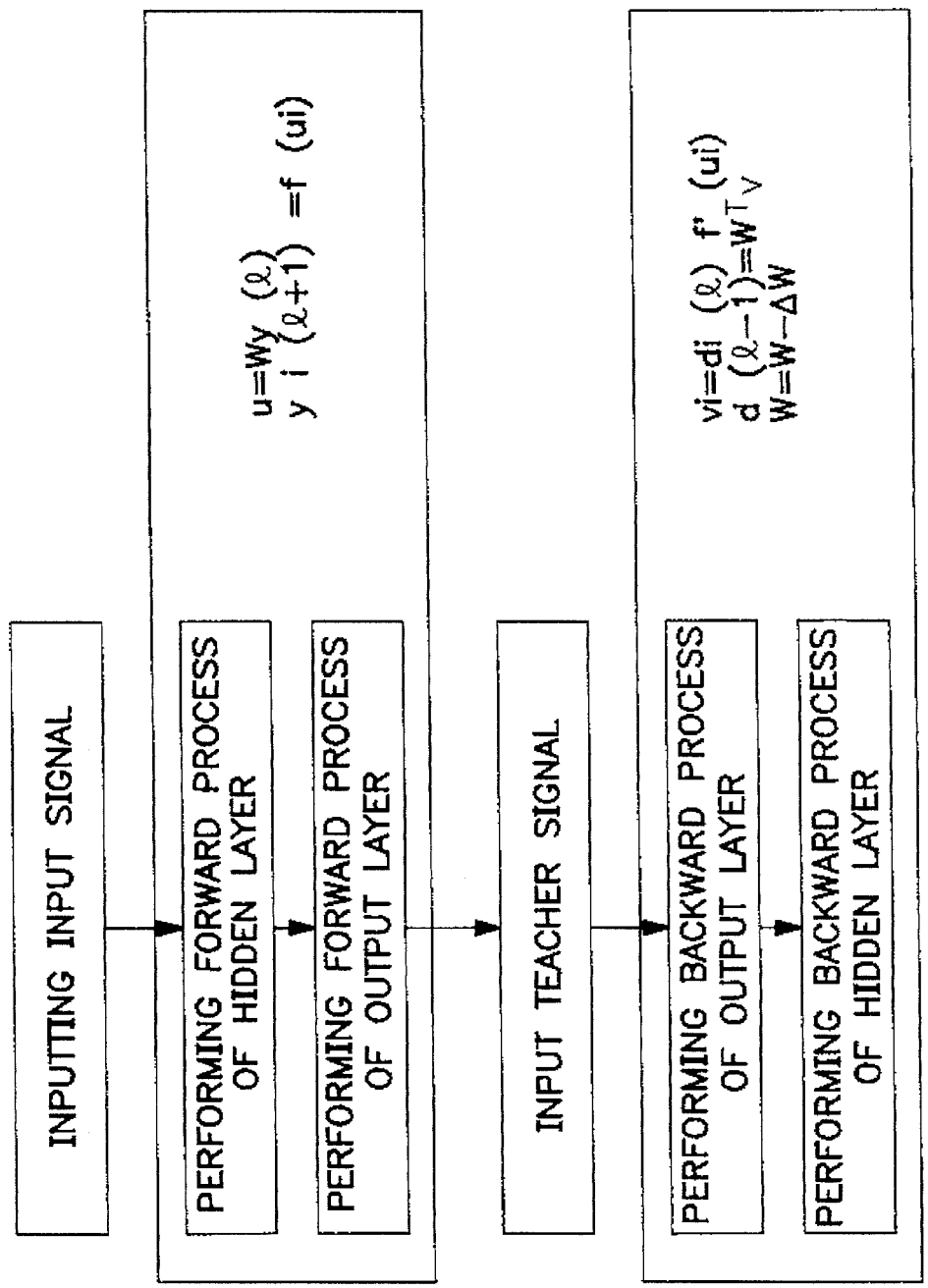
FIG. 16 is a process flowchart of the error back propagation.

The neurocomputer is further described by referring to FIG. 16. FIG. 16 shows a process flow for the learning based on the error back propagation method. In FIG. 16, y(l) is an output vector of a neuron of the l-th layer. W is a connection coefficient, that is, a weight matrix. f is a sigmoid function, d(l) is an error vector propagated backward from the output side of the l-th layer, and ΔW is a modification of a weight value.

When an input signal is applied to for example a three-layer configuration in which no operations are performed on input layers, the forward process is performed on a hidden layer, that is, an intermediate layer. This is represented by u=$W_y$(l). If the internal state vector u is provided with a nonlinear function, the result can be used as an input to the next layer, that is, the (l+1)th layer. Since this is the input to the output layer, the forward process is performed on the output layer.

Then, a teaching signal is inputted to start the backward process.

In the output layer, the error d between the teaching signal and the output signal is multiplied by the differentiation of f to perform the backward process. An error associated with the intermediate layer can be calculated by multiplying the variable v, which is obtained by multiplying a back-propagated error signal by a differentiation of f, by the transposed matrix (W), that is, $W^T$ of the weight matrix.

The backward process of the output layer and the backward process of the hidden layer are thus performed. The forward process includes the multiplication of the weight matrix W by the input vector y and the calculation of a sigmoid function of each element of the resultant vector. These operations can be parallelly performed by each of the neurons. The backward process is classified into two jobs: a backward propagation from the back to the front while sequentially modifying the error between the teaching signal and the output signal, the multiplication of the weight matrix W by the transposed matrix (W).

Figure 17:
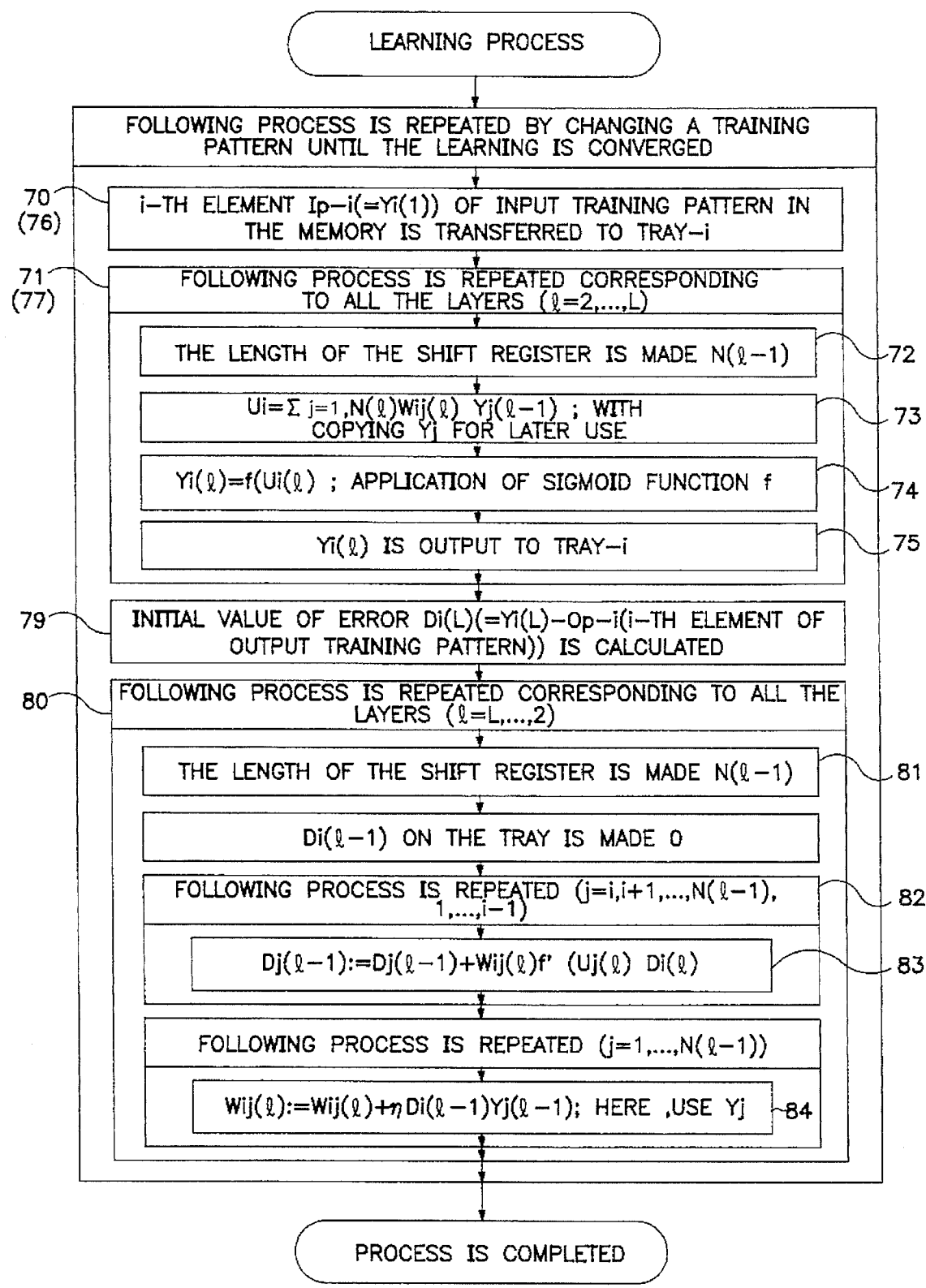
FIG. 17 is a flowchart of the whole learning process.

FIG. 17 is a flowchart for explaining the general learning process. The numbers 70(76), 71(77), 72, 73, 74, 75, 79, 80, 81, 82, 83, and 84 shown in FIG. 17 correspond to those in FIGS. 12, 13, and 14.

Figure 18:
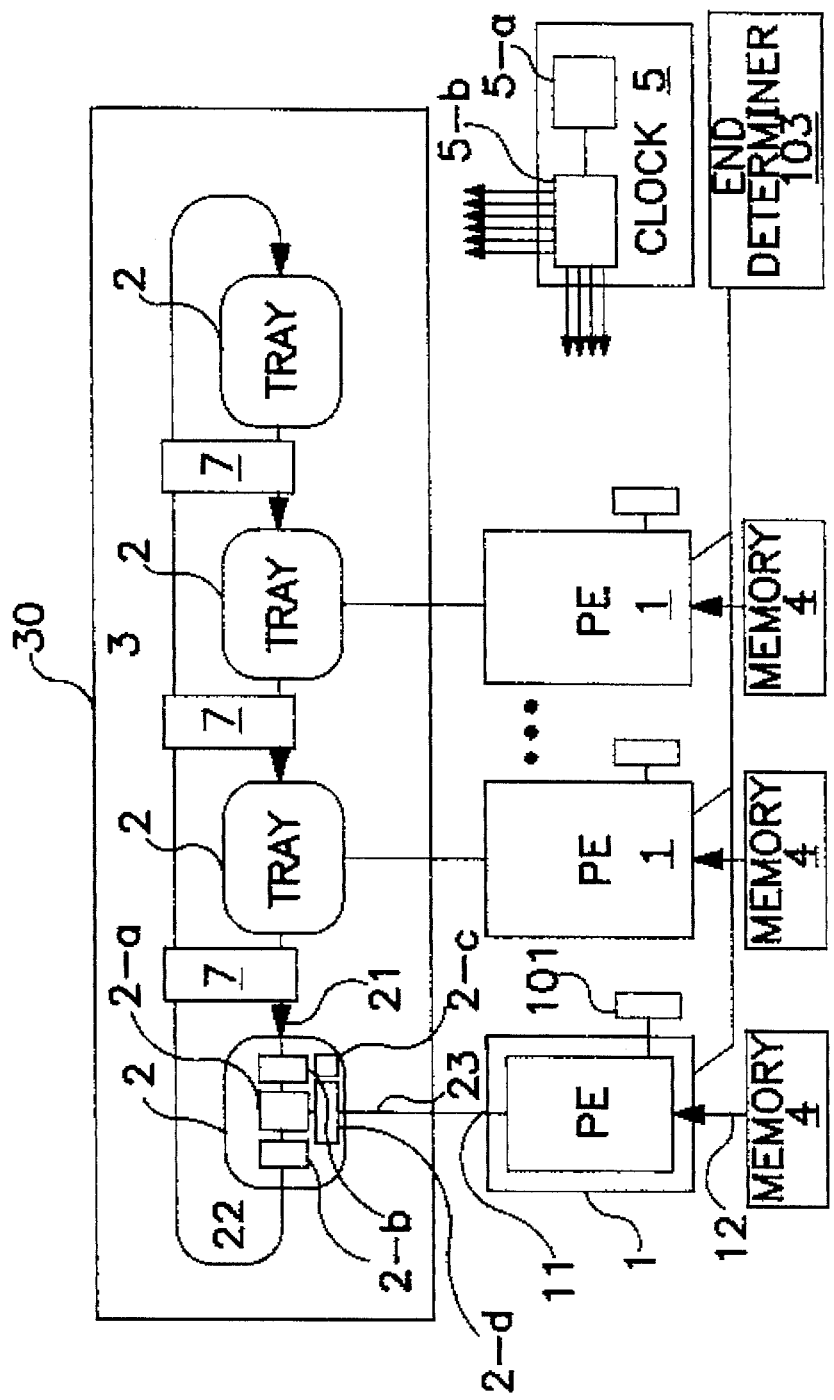
FIG. 18 is a configurational block diagram for explaining the embodiment of the system in which processor elements can be divided into a plurality of groups.

Next, a parallel data processing system is explained in which a plurality of processor elements (PE) comprising a parallel data processing system are divided into a plurality of groups each performing an independent operation. FIG. 18 is a configurational block diagram of a parallel data processing system. In FIG. 18, parts the same as those shown in FIG. 7 are assigned the same numbers. A clock generator 5 comprises a clock generating circuit 5-a and a clock distributing circuit 5-b, and the connector 6 shown in FIG. 7 is replaced with the tray connection switching unit 7 illustrated in FIG. 6. A sigmoid function processing unit 101 is used in the above described operation with a neurocomputer.

An end determiner 103 is used in the backward process, that is, in the learning process, with a neurocomputer. The end determiner 103 comprises a host computer connected to each of the data processing units 1 through a communication unit, a notification unit for notifying the host computer of an error between an operation result from each of the data processing units 1 and a teaching signal through the communication unit, a learning stopper for determining the end of learning according to a plurality of output error values and for stopping the learning of a neurocomputer.

The tray connection switching unit 7 switches to either the extended mode or the divisional mode. The whole system can be divided into a plurality of parts by setting to the divisional mode some of the tray connection switching units 7 shown in FIG. 18. Each group of the divided processor elements is permitted to perform an independent operation. If all the tray connection switching units 7 are set to the extended mode, a cyclic shift register 30 comprising the tray 2, the tray connection switching unit 7, and the data transmission path 3 can be most extended.

Figure 19:
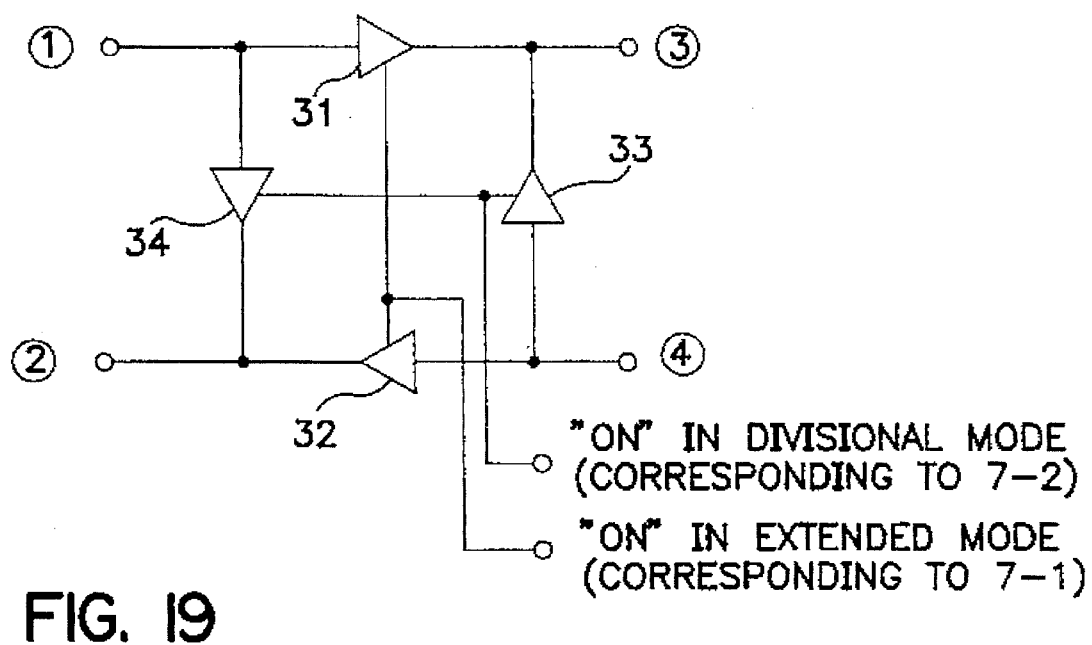
FIG. 19 is a configurational block diagram for explaining the embodiment of the tray connection switching unit.

FIG. 19 shows the configurational block diagram of the tray connection switching unit. In FIG. 19, the switch 7 comprises four tri-state buffer 31–34. The tri-state buffer 31 and 32 are set ON in the extended mode, while the tri-state buffer 33 and 34 are set ON in the divisional mode.

Figure 20:
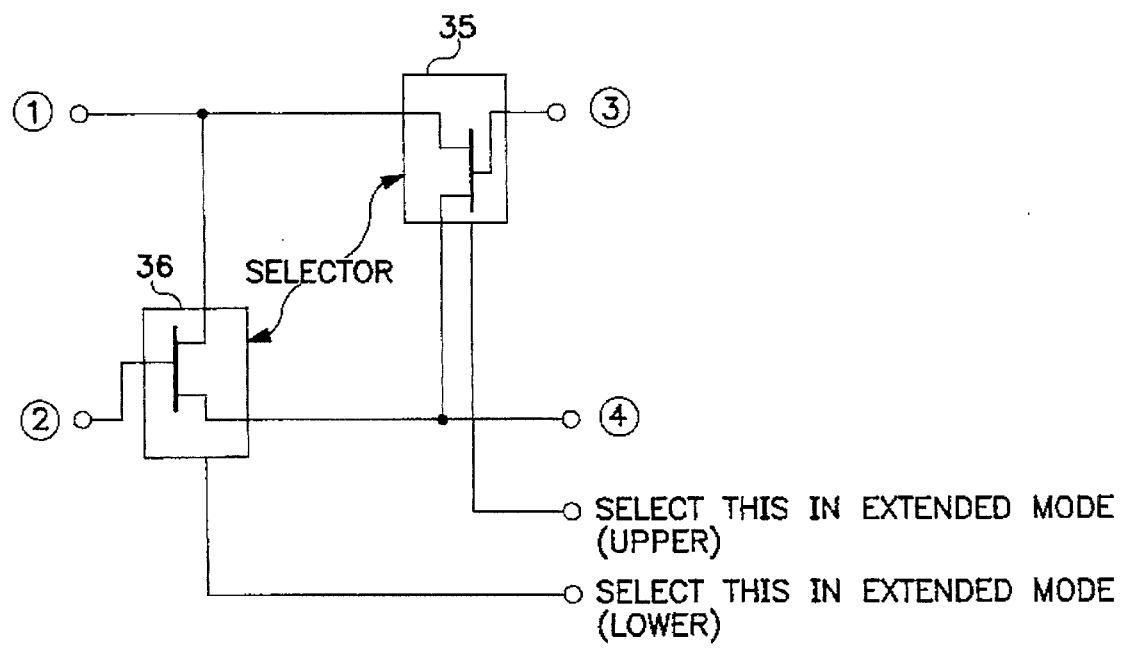
FIG. 20 is a configurational block diagram for explaining another embodiment of the tray connection switching unit.

FIG. 20 is a configurational block diagram of another embodiment of the tray connection switching unit. In FIG. 20, the switch 7 comprises two selectors 35 and 36. In the extended mode, the upper terminal of the selector 35 and the lower terminal of the selector 36 are selected, and vice-versa in the divisional mode.

Figure 21:
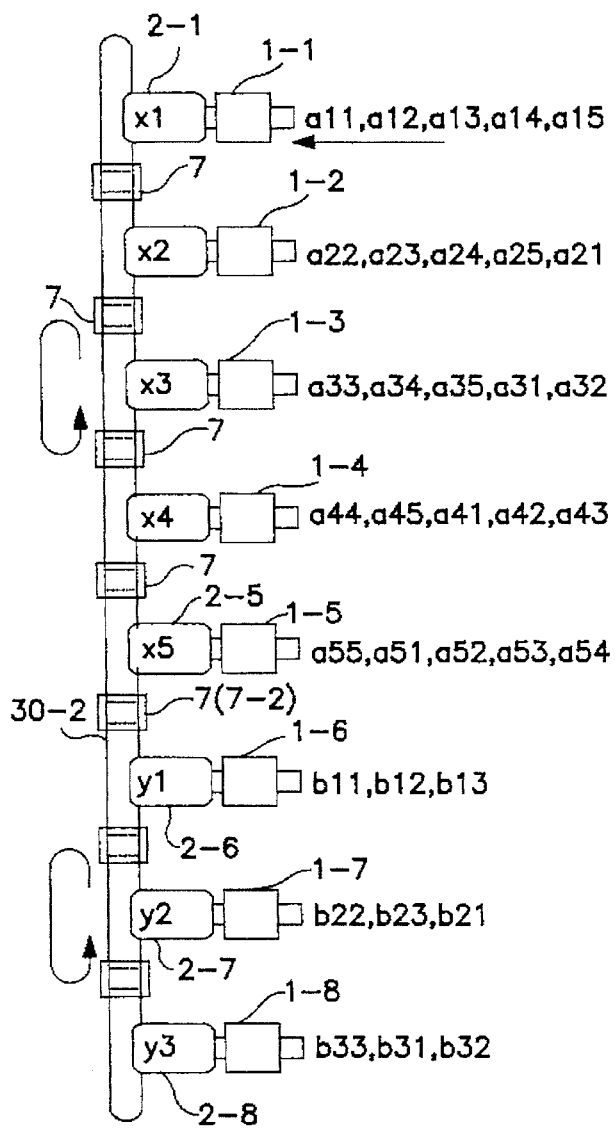
FIG. 21 is a view for explaining the operation for obtaining a matrix-and-product.
Figure 22:
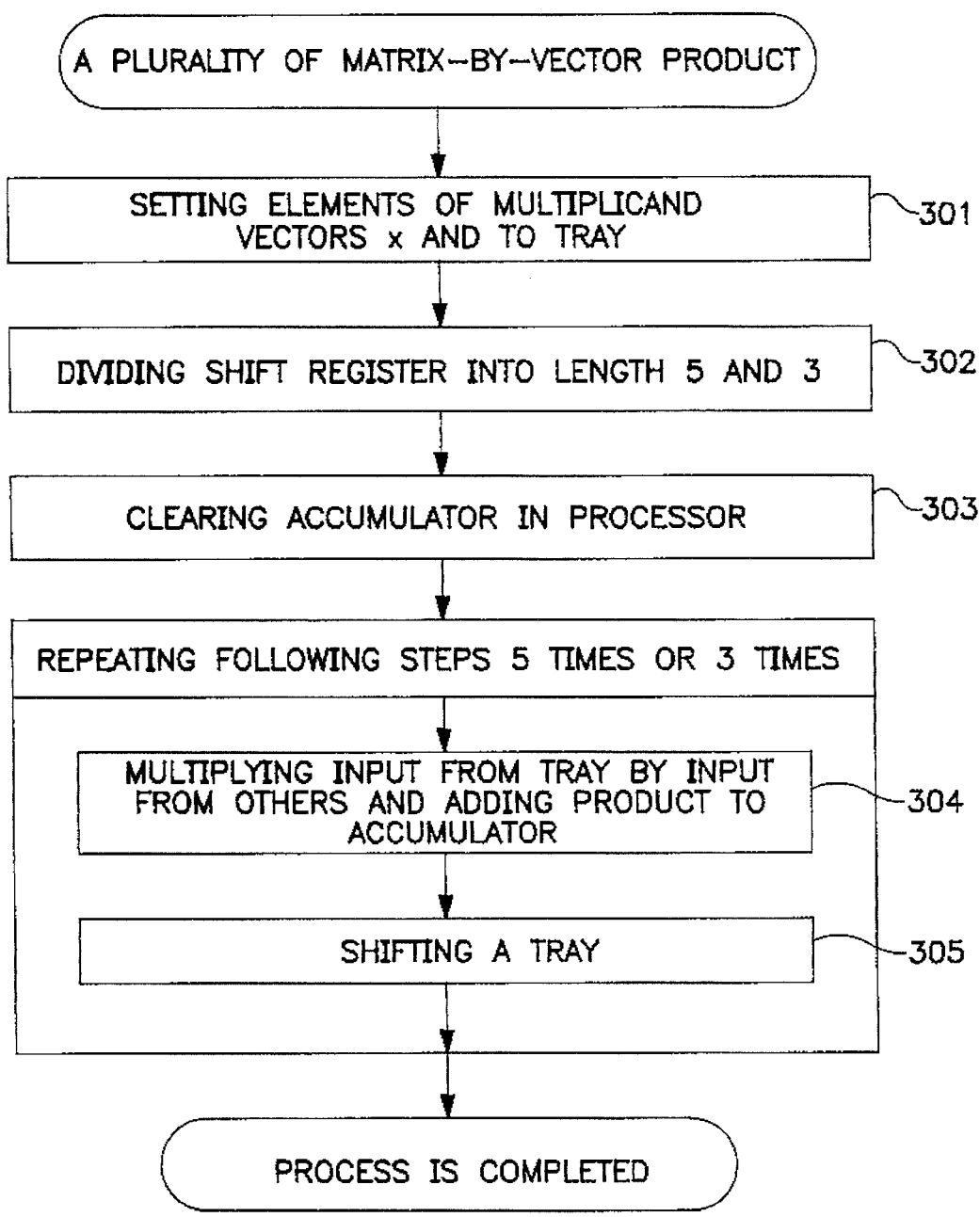
FIG. 22 is a flowchart of the operation for obtaining a matrix-and-product.

FIGS. 21 and 22 show views for explaining an operation for obtaining a matrix-times-vector product.

The numbers 1, 2, and 7 correspond to those in FIG. 6. In FIG. 21, a tray connection switching unit 7(7-2) is selected in the divisional mode, and the cyclic shift register 30 is divided into two shift registers 30-1 and 30-2.

Matrix A comprises elements $a_{11}, a_{12}, \ldots, a_{55}$, and matrix B comprises $b_{11}, b_{12}, \ldots, b_{33}$. An element of a vector variable x is provided for $x_1$ and $x_5$, and an element of a vector variable y is provided for $y_1$, $y_2$, and $y_3$.

The data processing unit 1-1 is provided with elements $a_{11}, a_{12}, \ldots, a_{15}$ by the memory 4 shown in FIG. 18. The data processing unit 1-2 is provided with elements $a_{22}, a_{23}, \ldots, a_{21}$ by the memory 4. In this way, the data processing unit 1-5 is provided with elements $a_{55}, a_{51}, \ldots, a_{54}$ by the memory 4. $x_1, x_2, x_3, x_4$, and $x_5$ are set to the trays 2-1 and 2-5, and then shifted cyclically.

Likewise, the data processing unit 1-6 is provided with elements $b_{11}, \ldots, b_{13}$ by the memory 4. In this way, the data processing unit 1-8 is provided with elements $b_{33}, \ldots, b_{32}$ by the memory 4. $y_1, y_2$, and $y_3$ are set to the trays 2-6–2-8, and shifted cyclically.

Step 301 shown in FIG. 22 indicates a setting of vector variables x and y in the operational configuration shown in FIG. 21. Step 302 indicates a dividing of the shift register into two units by the switching unit 7(7-2).

In step 303, an accumulator in each of the data processing units 1 is cleared. In step 304, the input ($x_i$ and $y_i$) applied from the side of the tray 2 is multiplied by the input ($a_{pq}$ and $b_{pq}$) applied from the side of the memory 4. The result is added to the accumulator. In step 305, the contents of the tray 2 are shifted. The processes of steps 304 and 305 are performed 5 times respectively on the side of the shift register 30-1, and three times on the side of the shift register 30-2 respectively. Thus, the calculations for Ax and By are performed. That is, a matrix-and-vector product can be obtained.

Figure 23:
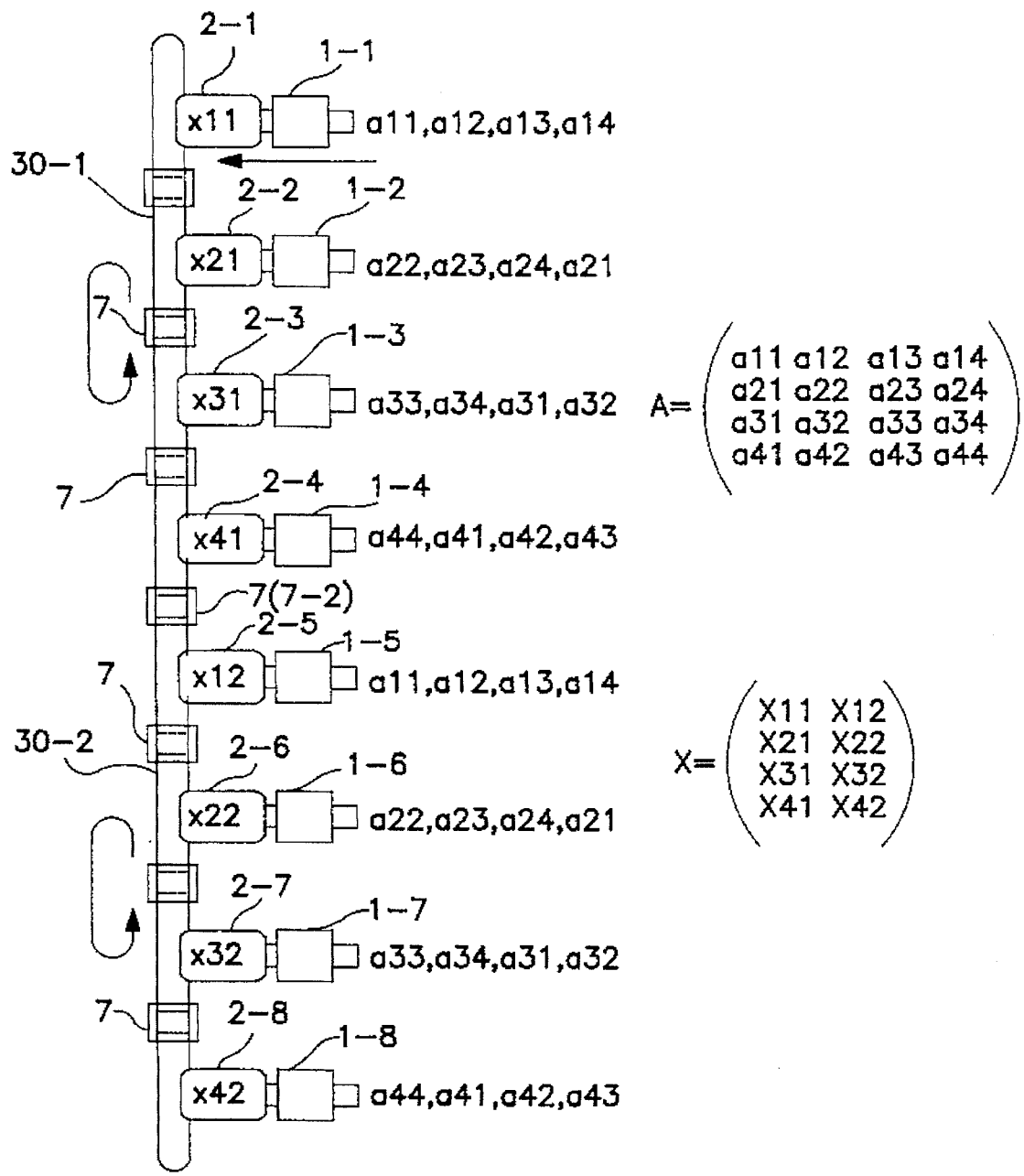
FIG. 23 is a view for explaining the operation for obtaining a matrix-and-product.
Figure 24:
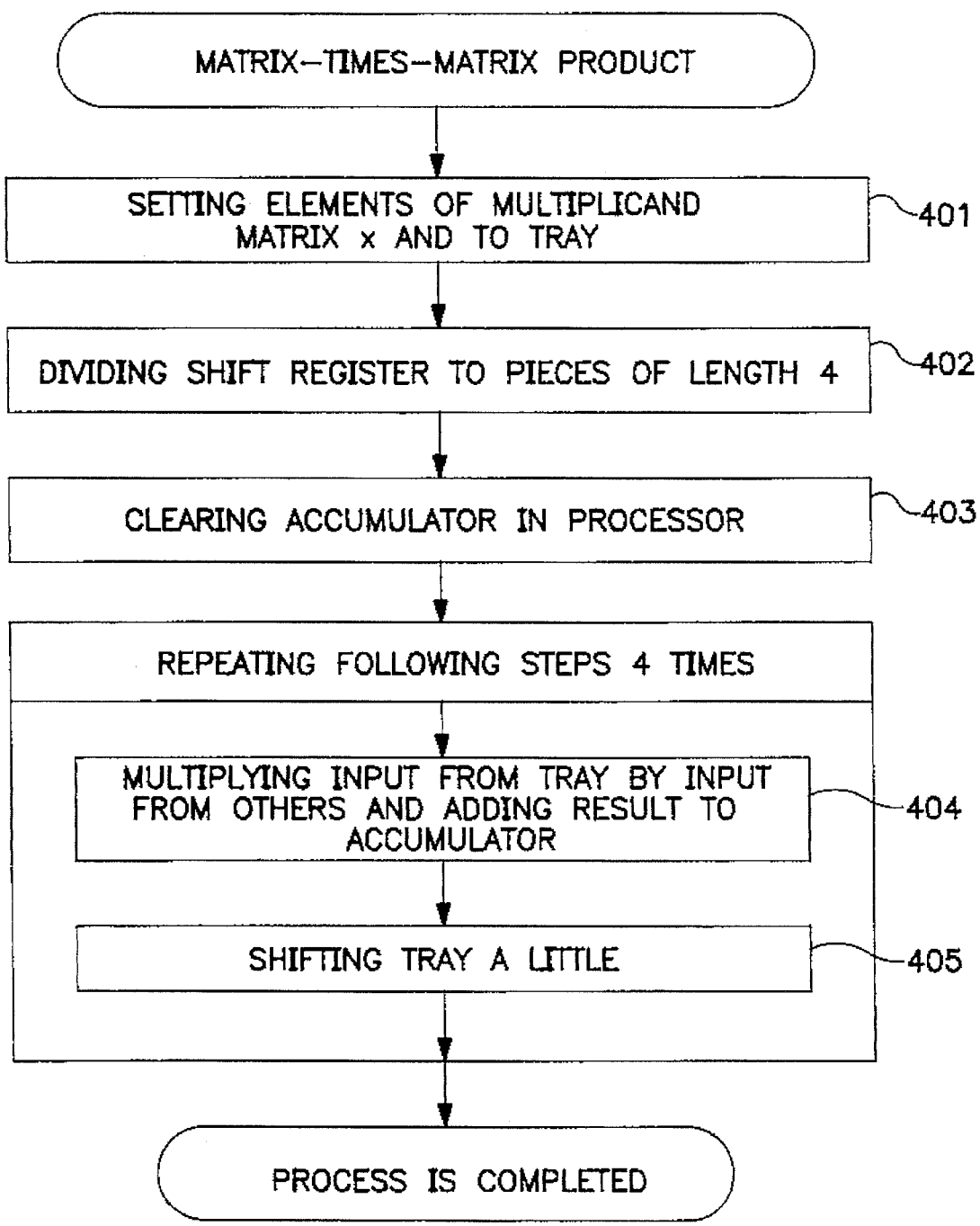
FIG. 24 is a flowchart of the operation for obtaining a matrix-and-product.

FIGS. 23 and 24 show views for explaining the operation for obtaining a matrix-and-matrix product. All the numbers in these figures correspond to the numbers shown in FIG. 6.

Assuming that matrix A and matrix B are set as shown in FIG. 23, $x_{11}$–$x_{41}$ are set to the trays 2-1–2-4 and then shifted cyclically. Likewise, $x_{12}$–$x_{42}$ are set in the trays 2-5–2-8, and then shifted cyclically.

Step 401 shown in FIG. 24 indicates a setting of an element of a matrix x multiplied by a matrix A (from the right) to the tray 2 in the operational configuration shown in FIG. 23. Step 402 indicates a dividing of the shift register into two units.

In step 403, the accumulator in each of the data processing units 1 is cleared. In step 404, $x_{ij}$ is multiplied by $a_{pq}$, and the product is added to the accumulator. In step 405, the contents of the tray 2 are shifted. The processes of steps 404 and 405 are repeated four times.

Figure 25:
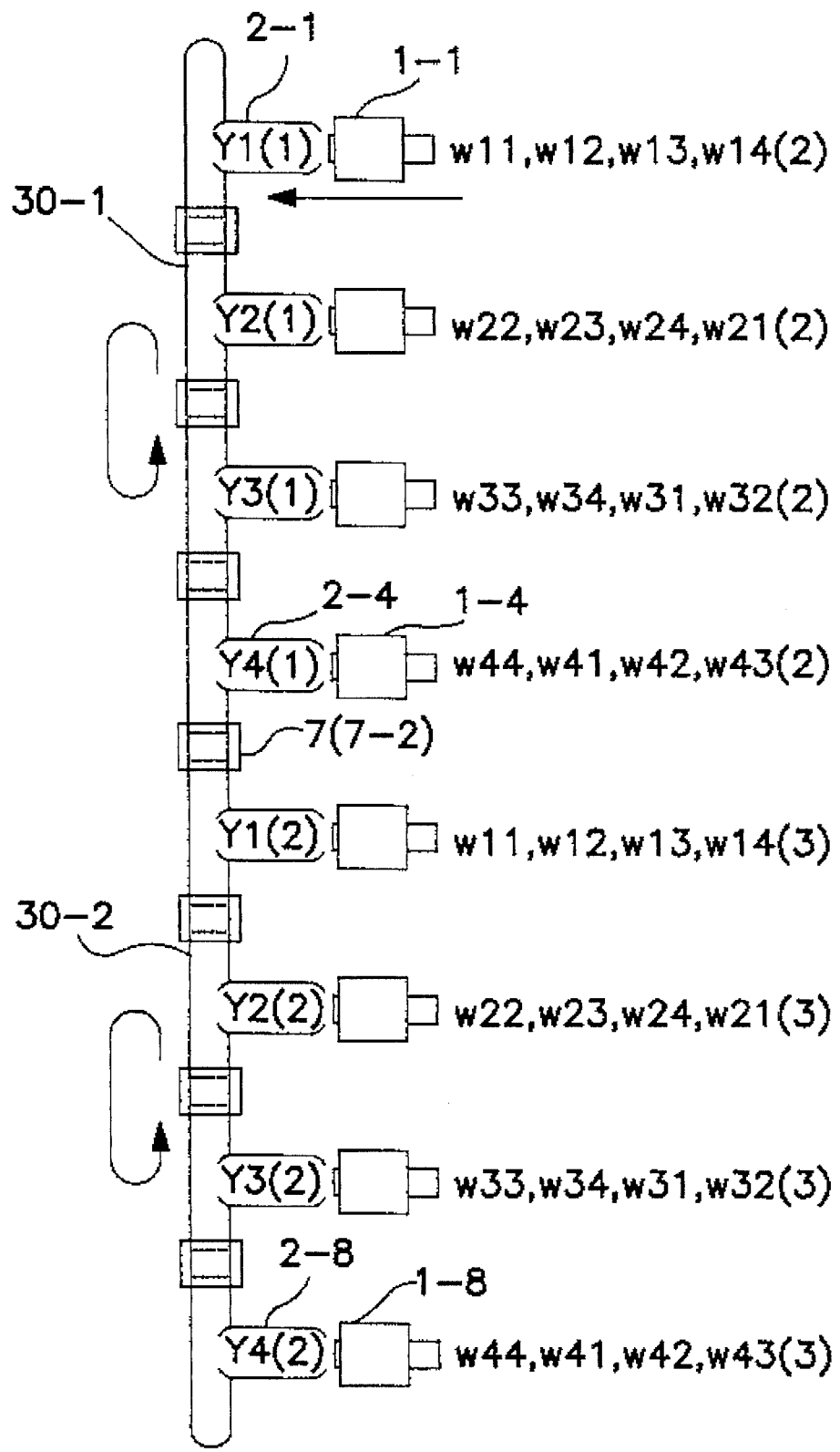
FIG. 25 is a view for explaining the forward process in the system shown in FIG. 18.
Figure 26:
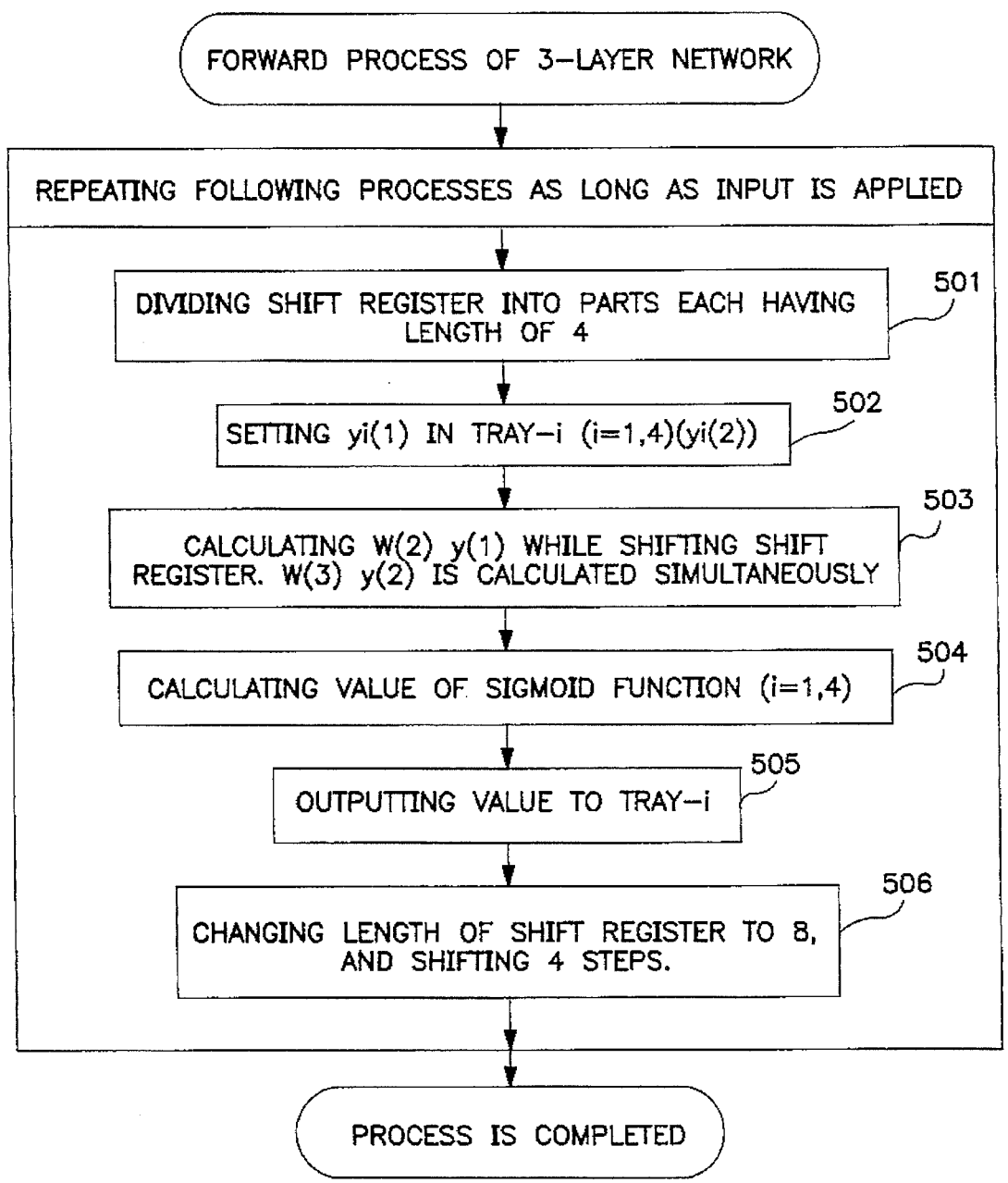
FIG. 26 is a flowchart of a forward process.

FIGS. 25 and 26 show views for explaining the forward process using a three-layer-network neurocomputer. The numbers shown in these figures correspond to those in FIG. 6.

The forward process corresponds to the following multiply-and-add calculation.

$$\begin{bmatrix} u_1 \\ u_2 \\ u_3 \\ u_4 \end{bmatrix} = \begin{bmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{bmatrix} \begin{bmatrix} y_1 \\ y_2 \\ y_3 \\ y_4 \end{bmatrix} \qquad (9)$$

where $u_1, u_2, u_3$, and $u_4$ correspond to the l-th layer, and $y_1, y_2, y_3$, and $y_4$ correspond to the (l–1)th layer.

The weight W indicates the weight value between the (l–1)th layer and the lth layer. The vector y indicates the output vector at the unit in the l–1)th operation. As clearly indicated in FIGS. 25 and 26, the shift register is divided in step 502 into two shift registers 30-1 and 30-2 as shown in FIG. 25, each register being 4 in length. In step 502, vectors $y_i(1)$ and $y_i(2)$ are set.

In step 503, $w_{(2)}y_{(1)}$ and $w_{(3)}y_{(2)}$ are calculated. In step 504, a sigmoid function value can be calculated by the sigmoid function processing unit 101 shown in FIG. 18. In step 505, a sigmoid function value is outputted to the tray 2-i. In step 506, the shift register 30-1 is connected to the shift register 30-2, that is, the length is set to 8, and then the connected shift register is shifted four values. The processes in steps 501–506 are repeated as long as inputs are applied, and then the forward process is completed.

That is, the forward processes are performed in a pipeline manner. First, data to be inputted to the input layer units are provided to the tray of one of the divided shift registers. For example, in a three-layer network, data to be outputted from the intermediate layer units are calculated. In this period, data are not set on the other shift register tray, and only one shift register is valid. When the output of the intermediate layer units is calculated in step 504, the value is outputted to the tray by overwriting the input data presently in the tray, thus clearing the input data, and the data are shifted to the other shift register tray in step 506.

Then, new input data are set on the shift register tray in which a calculation has just been completed, the output of the intermediate layer units is calculated for the new data in the shift resister, and the output of the intermediate layer units shifted to the other shift register is used in concurrently calculating the output from the output layer units. Likewise, the forward processes are performed in a pipeline manner as long as input data are applied.

In the above described three-layer hierarchical neural network, the output of the output layer units cannot be used again in the network. However, the output can be used again in recurrent networks, for example. The explanation of the control of data transmission is skipped here.

Figure 27:
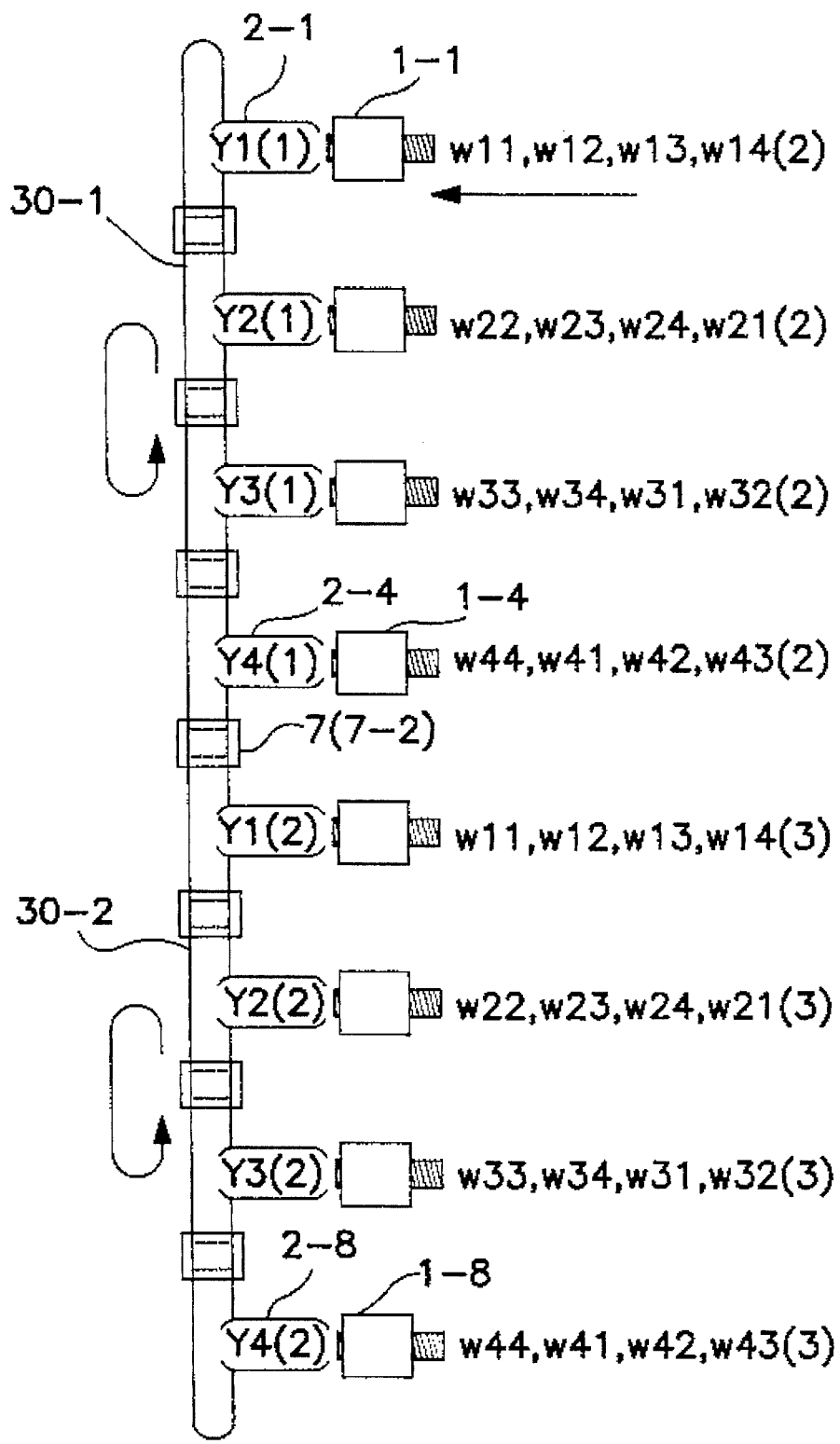
FIG. 27 is a view for explaining the backward process of the system shown in FIG. 18.
Figure 28:
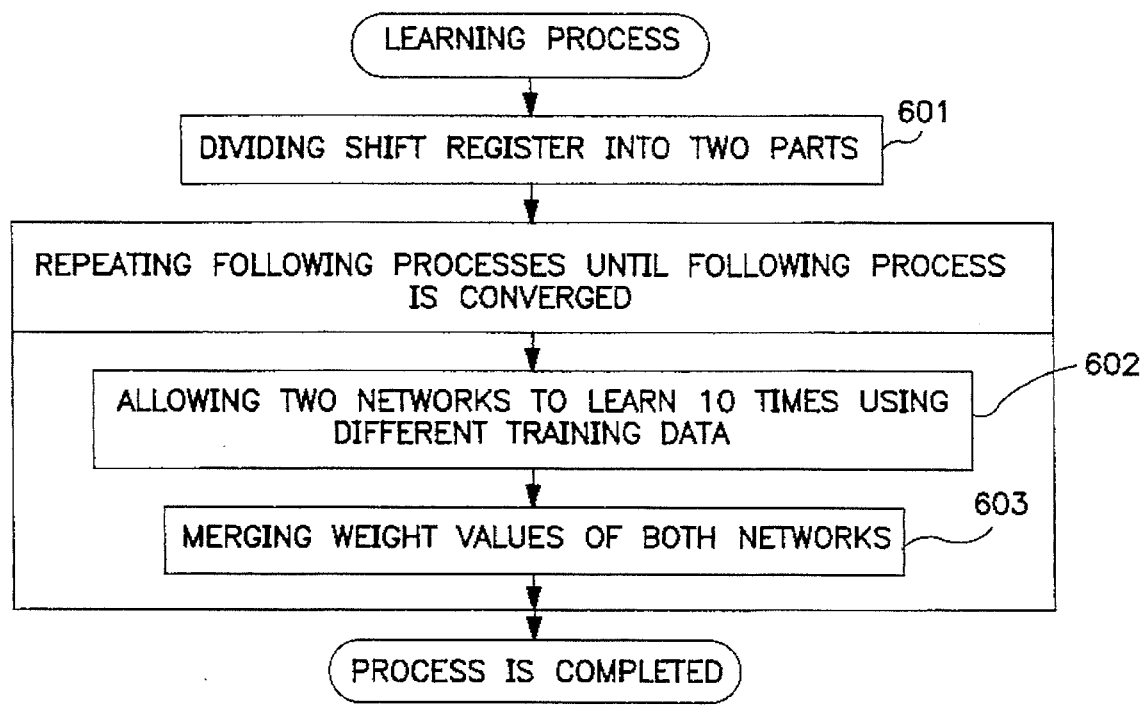
FIG. 28 is a flowchart of a backward process.

FIGS. 27 and 28 are views for explaining the backward process. The numbers in these figures correspond to those shown in FIG. 18. The backward process corresponds to the sum-of-products calculation shown in FIG. 9. In step 601 shown in FIG. 28, the shift register 30 is divided into two equal parts. In step 602, a learning process is repeated using different training data in the networks containing the registers 30-1 and 30-2. With regard 10 different training data, for example, a learning process is consequently conducted in parallel in the register 30-1 and 30-2 with regard to 5 training data, respectively. Then, in step 603, weight updating values in the networks each containing each shift register are merged. According to so-called batch type learning method, the values of corresponding (or in-the-same-place) delta-weight are integrated in each network and the average of the values of the delta-weight is added to the corresponding weight (sometimes called "merging" delta-weight process).

Figure 29:
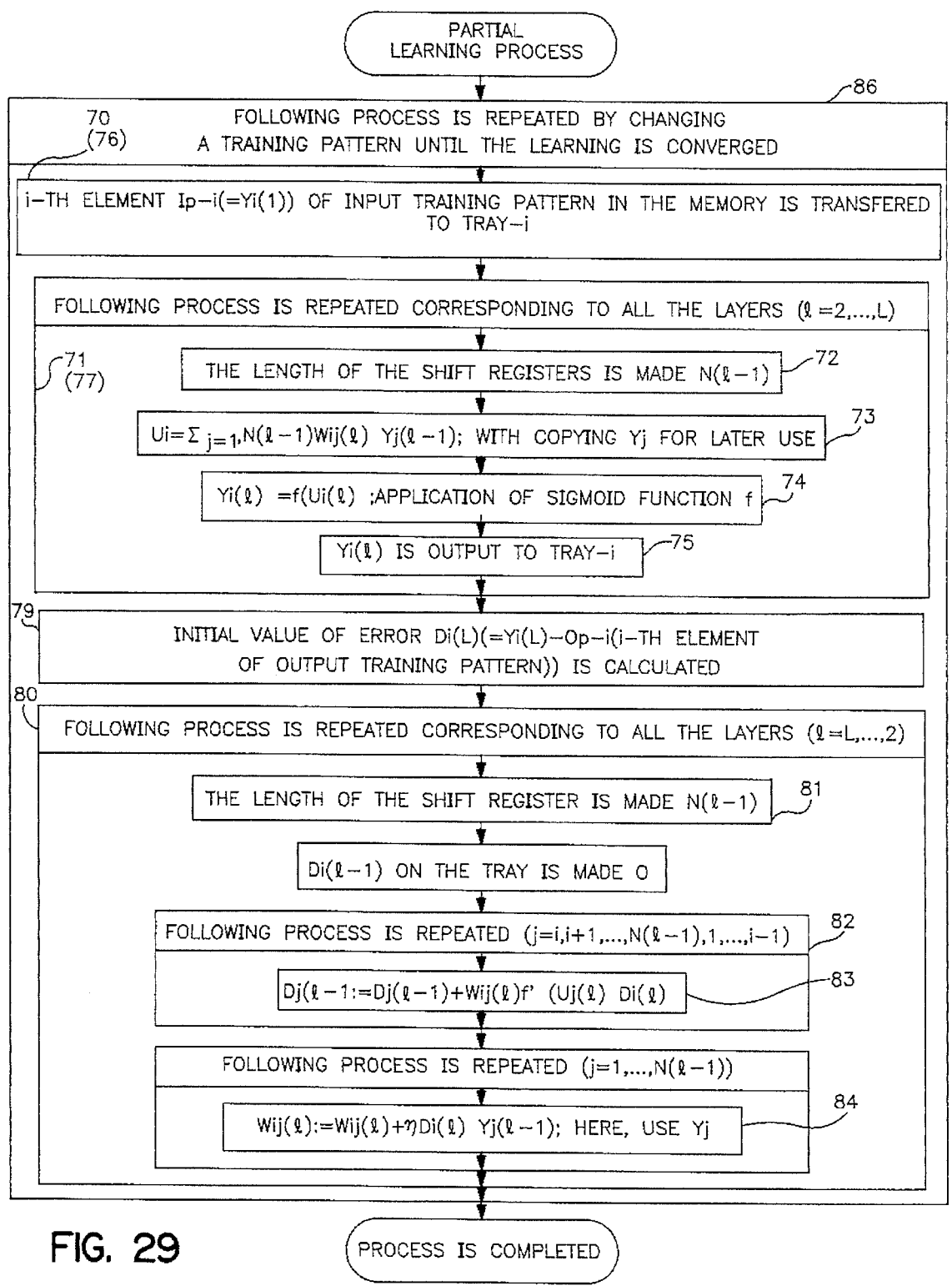
FIG. 29 is a flowchart for explaining an error back propagation learning law.

FIG. 29 is a flowchart of the error back propagation low. It corresponds to FIG. 17 for explaining a process as a general operation with a neurocomputer, and also corresponds to FIGS. 26 and 28.

The present invention can be used for all industrial fields in which operations, specifically for obtaining a plurality sets of matrix-times-vector products or matrix-times-matrix vector products, with a parallel computer system comprising a plurality of processors must be performed.

What is claimed is:

1. A parallel data processing system comprising:

a plurality of data processing units;

a plurality of trays, each including only one register, for storing and transmitting data, each of said plurality of trays being connected to each of said plurality of data processing units in only a one-to-one correspondence and being connected to each other only one-dimensionally through a data transmission path;

a plurality of tray connection switching means for selectively changing a connection of said plurality of trays via said data transmission path to either a first connection state or a second connection state, for dividing said plurality of trays and said plurality of data processing units each into a plurality of groups, and for permitting each of said plurality of groups to perform an independent operation, said first connection state having a first number of said plurality of groups of said trays connected via said data transmission path and said second connection state having a second number of said plurality of groups of said trays connected via said data transmission path, said second number being larger than said first number; and a clock generating unit for generating a clock signal for synchronizing a data transmitting operation between said plurality of trays through said data transmission path and a data processing operation performed by said plurality of data processing units.

2. A parallel data processing system according to claim 1, wherein each of said plurality of trays comprise:

a flip-flop for storing data, a 3-input/1-output multiplexer having an output terminal connected to a data input terminal of said flip-flop, three buffers each having two terminals connected for a transmission to said data transmission path through which data are transmitted to and from another said tray to each input terminal of said multiplexer and for a transmission from a terminal connected to said data processing unit to each input terminal of said multiplexer, and three tri-state buffers connected for transmission from the data output terminal of said flip-flop to two terminals connected to said data transmission path and for the transmission from the data output terminal of said flip-flop to the terminal connected to said data processing unit.

3. A parallel data processing system according to claim 1, wherein said plurality of trays, said data transmission path, and said plurality of tray connection switching means form a cyclic shift register.

4. A parallel data processing system according to claim 3, wherein a 2-way data transmission is conducted in said cyclic shift register.

5. A parallel data processing system according to claim 3, wherein said first connection state and said second connection state correspond to an extended mode and to a divisional mode, respectively, and said plurality of tray connection switching means each comprise a first terminal, a second terminal, a third terminal, and a fourth terminal, and selectively switches either to:

the extended mode in which said first terminal and said third terminal are internally connected, and said second terminal and said fourth terminal are internally connected in order to set said cyclic shift register in an extended state having said first number of said plurality of groups, or the divisional mode in which said first terminal and said second terminal are internally connected, and said third terminal and said fourth terminal are internally connected in order to divide said cyclic shift register into a plurality of cyclic shift registers having said second number of said plurality of said groups.

6. A parallel data processing system according to claim 5, wherein said plurality of tray connection switching means each comprise a first tri-state buffer connected for the transmission from said terminal to said terminal, a second tri-state buffer connected for transmission from said terminal to said terminal, a third tri-state buffer connected for transmission from said terminal to said terminal, and a fourth tri-state buffer connected for transmission from said terminal to said terminal, sets said first and second tri-state buffer to ON in said extended mode, and sets said third and fourth tri-state buffer to ON in said divisional mode.

7. A parallel data processing system according to claim 5, wherein said plurality of tray connection switching means each comprise a first and a second selector each comprising two selected terminals and another non-selected terminal connected to either of said selected terminals, said terminal is connected to the first terminal of said two selected terminals of said first and second selectors, said terminal is connected to a non-selected terminal of said second selector, said third terminal is connected to a non-selected terminal of said first selector, and said terminal is connected to the second terminal of said two selected terminals of said first and second selectors, and in said extended mode, said first selector selects the first terminal of said two selected terminals, and said second selector selects the second terminal of said two selected terminals, and in said divisional mode, said first selector selects the second terminal of said two selected terminals, and said second selector selects the first terminal of said two selected terminals.

8. A parallel data processing system according to claim 1, wherein said plurality of data processing units are provided with a sigmoid function processing unit.

9. A parallel data processing system according to claim 1, wherein said plurality of data processing units are each connected to a memory for storing at least one variable for a corresponding said data processing unit.

10. A parallel data processing system according to claim 1, wherein said plurality of data processing units perform the following forward processes in a forward process in said neural network in which said neural network comprises the first layer as an input layer to the L-the layer as an output layer, and the output of each layer unit from the second to the L-th layer is obtained, said shift register comprising said tray, data transmission path and tray connection switching means is divided into L–1 units of shift registers each including the number of trays equal to the number of units in the layers from the first to the (L–1)th layer for obtaining an output of unit for the second through the L-th layers, input data are set on a tray of said shift register for obtaining an output of a unit in the second layer, the content of said accumulator in said data processing unit connected to the tray in each of the divided shift registers is cleared, an element of a row in a matrix of weight values between a target layer unit and the previous layer unit stored in said memory in said data processing unit is multiplied by data on said tray, a sigmoid function value is calculated according to said multiplication result, said sigmoid function value is outputted to the connected tray, divided shift registers are connected and the content of the tray is shifted by the number of units before the target layer between connected shift registers, and the processes after performing data sets on the tray corresponding to said input layer unit are repeated as long as data are inputted.

11. A parallel data processing system according to claim 1, wherein said plurality of data processing units perform the following processes as a multiplication of a matrix of m rows and n columns by an n-dimensional vector and in a multiplication of a matrix of p rows and q columns by a q-dimensional vector as a plurality of sets of operations to obtain a matrix-and-vector product, an element of an n-dimensional vector is set on n trays, and an element of q-th dimensional vector is set on q trays, a shift register comprising said tray, said data transmission path, and said tray connection switching means is divided into a first shift register including n trays and a second shift register including q trays, an accumulator in all data processing units each connected one-to-one to each tray is cleared, one of the elements of a matrix stored in said memory in each data processing unit is multiplied by an element of a vector set on a tray and the product is added to the content of said accumulator, an element of a vector set on a tray in each of the divided shift registers is shifted by one step, said multiplication of an element of a row in a matrix by an element of a vector and said addition to the content of said accumulator performed in said data processing unit are repeated n times in said fist shift register and q times in said second shift register.

12. A parallel data processing system according to claim 3, wherein said plurality of data processing units include a plurality of sets of data processing units, each of said sets of data processing units performing a single operation, to thereby calculate a matrix-and-matrix product.

13. A parallel data processing system according to claim 12, wherein said sets of data processing units perform the following processes to calculate said matrix-and-matrix product as an operation of multiplying a matrix of m rows and n columns by a matrix of n rows and l columns, n elements of each column in a matrix of n rows and l columns are set on l sets of trays, said shift register comprising said plurality of trays, said data transmission path, and said plurality of tray connection switching means is divided into a first, a second, . . . , and a l-th shift register each containing n trays, the content of an accumulator in all data processing units connected one-to-one to each tray is cleared, each of said data processing units multiplies one of the elements of each row in a matrix of m rows and n columns stored in said memory in each data processing unit by one of the elements of each column of a matrix of n rows and l columns set on a tray, and adds the result to the content of said accumulator, an element of each column of a matrix of n rows and l columns in each of the divided shift registers is shifted by one step, and a multiplication of one element of a matrix by one element of another matrix and an addition to the content of an accumulator are repeated n times in each of the shifted registers.

14. A parallel data processing system according to claim 3, wherein said shift register comprising said plurality of trays, said data transmission path, and said plurality of tray connection switching means is divided into a plurality of shift registers in said backward process in said neutral network, each network comprising a tray in each of said divided shift registers and said data processing unit connected to said tray performs a learning process using different training data, weight values of each of said networks are merged after said learning process, and processes after said learning processes of said networks are repeated until an error is converged.

15. The parallel data processors system according to claim 1 wherein, operations are conducted in parallel when said tray connection switching means divides the trays and processor elements into a plurality of groups and the results obtained from the operations of respective groups of the divided trays and processor elements are merged when said tray connection switching means connect said groups of the divided trays and processors.

16. The parallel data processing system according to claim 15 wherein, when a neuron computing is performed, whole training data are divided and the divided training data are distributed to said groups of said divided trays and processor elements to caluculate delta weights in parallel and the calculated delta weights are merged to perform a learning with regard to the whole training data.

* * * * *

UNITED STATES PATENT AND TRADEMARK OFFICE
CERTIFICATE OF CORRECTION

PATENT NO. : 5,544,336

DATED : August 6, 1996

INVENTOR(S) : Hideki KATO et al.

It is certified that error appears in the above-indentified patent and that said Letters Patent is hereby corrected as shown below:

Column 5, line 8, after "DETAILED" insert --DESCRIPTION--.

Column 7, line 46, "$A_{mm+1}$, $A_{mm-1}$" should be --$A_{m\ m+1}$, $A_{m\ m-1}$--; and line 51, after "Therefore," delete ".".

Column 8, line 3, "$A_{mm+1}$" should be --$A_{m\ m+1}$--; and line 16, "$X_{mm+2}$" should be --$X_{m\ m+2}$--.

UNITED STATES PATENT AND TRADEMARK OFFICE
CERTIFICATE OF CORRECTION

PATENT NO. : 5,544,336
DATED : August 6, 1996
INVENTOR(S) : Hideki Kato et al

It is certified that error appears in the above-indentified patent and that said Letters Patent is hereby corrected as shown below:

Column 9, line 56, "value 1" should be --value $\ell$--;

line 57, "N(l-1)" should be --N($\ell$-1)--;

line 58, "l=2" should be --$\ell$=2--;

line 62, "(l)" (second occurence) should be --($\ell$)--; and line 64, "l=2. $Y_j$ (l-1)" should be --$\ell$=2. $Y_j$ ($\ell$-1)--.

Column 10, line 25, "(l)" (both occurences) should be --($\ell$)--; and lines 26, 28, 30, 34, 36, 38 and 66, "(l)" (all occurences) should be --($\ell$)--;

lines 37 and 39, "(l+1)th" should be --($\ell$+1)th--; and line 39, "$Y_i$(l)" should be --$Y_i$($\ell$)--.

UNITED STATES PATENT AND TRADEMARK OFFICE
CERTIFICATE OF CORRECTION

PATENT NO. : 5,544,336
DATED : August 6, 1996
INVENTOR(S) : Hideki KATO et al.

It is certified that error appears in the above-indentified patent and that said Letters Patent is hereby corrected as shown below:

Column 11, line 1, "l-th" should be --$\ell$-th--;

line 6, "(l-1)" (both occurences) should be --($\ell$-1)--;

line 8, "$\sum_{j=1}^{N(l)} W_{ij}(l)D_j(l)$" should be --$\sum_{j=1}^{N(\ell)} W_{ij}(\ell)D_j(\ell)$--;

line 10, "(l=2, . . ., L)" should be --($\ell$=2, . . ., L)--;

lines 12, 34, 49, "(l)" (all occurences) should be --($\ell$)--;

line 36, "$\Delta W_{ij(l)}^{(t)} = \eta D_i(l)Y_j(l-1)$ (l=2, . . . , L)" should be --$\Delta W_{ij(\ell)}^{(t)} = \eta D_i(\ell)Y_j(\ell-1)$ ($\ell$=2, . . . , L)--;

line 43, "$\Delta W_{ij(l)}^{(t+1)} \eta = D_i(l)Y_j(l-1) + \alpha W_{ij}(l)^{(t)}$" --$\Delta W_{ij(\ell)}^{(t+1)} = \eta D_i(\ell)Y_j(\ell-1) + \alpha \Delta W_{ij}(\ell)^{(t)}$--; and line 67, "l-th" should be --$\ell$-th-- and "N(l)" should be --N($\ell$)--.

UNITED STATES PATENT AND TRADEMARK OFFICE
CERTIFICATE OF CORRECTION

PATENT NO. : 5,544,336

DATED : August 6, 1996

INVENTOR(S) : Hideki KATO et al.

It is certified that error appears in the above-indentified patent and that said Letters Patent is hereby corrected as shown below:

Column 12, line 1, "N(l)" should be --N($\ell$)--;

line 5, "(l)" should be --($\ell$)--;

line 9, "$D_i$(l-1)" should be --$D_i$($\ell$-1)--;

line 25, "y(l)" should be --y($\ell$)-- and "l-th" should be --$\ell$-th--;

line 27, "d(l)" should be --d($\ell$)--;

line 28, "l-th" should be --$\ell$-th--;

line 34, "(l)" should be --($\ell$)--; and line 36, "(l+1)th" should be --($\ell$+1)th--.

UNITED STATES PATENT AND TRADEMARK OFFICE
CERTIFICATE OF CORRECTION

PATENT NO. : 5,544,336
DATED : August 6, 1996
INVENTOR(S) : Hideki Kato et al

It is certified that error appears in the above-indentified patent and that said Letters Patent is hereby corrected as shown below:

Column 13, line 42, delete paragraph indentation.

Column 14, line 39, "l-th" should be --$\ell$-th--;

line 40, "(l-1)th" should be --($\ell$-1)th--;

line 42, "(l-1)th" should be --($\ell$-1)th-- and "lth" should be --$\ell$th--; and line 43, "l-1)th" should be --($\ell$-1)th--.

Column 18, lines 33, 35, 48 and 51, "(l)" (all occurences) should be --($\ell$)--.

Signed and Sealed this

Fourth Day of March, 1997

Attest:

BRUCE LEHMAN

Attesting Officer

Commissioner of Patents and Trademarks